(12) United States Patent
Ichikawa et al.

(10) Patent No.: US 7,835,078 B2
(45) Date of Patent: Nov. 16, 2010

(54) REFLECTING SCREEN, METHOD OF MANUFACTURING THE SAME, AND REFLECTION-TYPE PROJECTION SYSTEM

(75) Inventors: Nobuhiko Ichikawa, Tokyo-To (JP); Hiroshi Sekiguchi, Tokyo-To (JP); Jun Horikoshi, Tokyo-To (JP); Akihide Sano, Tokyo-To (JP); Takeshi Ogawa, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 590 days.

(21) Appl. No.: 11/596,859

(22) PCT Filed: Feb. 2, 2006

(86) PCT No.: PCT/JP2006/301725

§ 371 (c)(1),
(2), (4) Date: Nov. 17, 2006

(87) PCT Pub. No.: WO2006/082870

PCT Pub. Date: Aug. 10, 2006

(65) Prior Publication Data

US 2008/0030882 A1  Feb. 7, 2008

(30) Foreign Application Priority Data

Feb. 2, 2005 (JP) .......................... 2005-026354
Mar. 23, 2005 (JP) .......................... 2005-084008
Apr. 4, 2005 (JP) .......................... 2005-107786

(51) Int. Cl.
*G03B 21/60* (2006.01)

(52) U.S. Cl. .................................. 359/443; 359/449

(58) Field of Classification Search ................. 359/443, 359/449, 452, 454, 459
See application file for complete search history.

(56) References Cited

U.S. PATENT DOCUMENTS

| 4,767,186 | A | * | 8/1988 | Bradley et al. | ............. 359/452 |
| 4,911,529 | A | * | 3/1990 | Van De Ven | ............. 359/454 |
| 5,414,558 | A | * | 5/1995 | You | ............. 359/451 |
| 5,668,662 | A | * | 9/1997 | Magocs et al. | ............. 359/452 |
| 6,040,941 | A | * | 3/2000 | Miwa et al. | ............. 359/443 |
| 6,144,491 | A | * | 11/2000 | Orikasa et al. | ............. 359/452 |
| 6,233,095 | B1 | | 5/2001 | Niwa et al. | |

(Continued)

FOREIGN PATENT DOCUMENTS

CN 1385754 A 12/2002

(Continued)

*Primary Examiner*—Christopher E Mahoney
*Assistant Examiner*—Leon W. Rhodes
(74) *Attorney, Agent, or Firm*—Oliff & Berridge, PLC

(57) ABSTRACT

A reflecting screen 10 comprises a base portion 11, light transmitting portions 12 provided on the base portion 11, and light absorbing portions 14. Each of the light transmitting portions 12 comprises a unit prism shape 12 which has a generally wedge-like shape with a larger width on the image source side than its width on the rear face side and is arranged along a screen face 10a. A reflecting layer 13 adapted to reflect the image light, which has been transmitted through the unit prism shapes 12, is provided on the rear face side of each unit prism shape 12. Each unit prism shape 2 extends linearly, and each light absorbing portion 14 is arranged between each adjacent pair of the unit prism shapes 12.

5 Claims, 21 Drawing Sheets

U.S. PATENT DOCUMENTS

| | | |
|---|---|---|
| 6,288,172 B1 * | 9/2001 | Goetz et al. .................. 525/200 |
| 6,381,068 B1 * | 4/2002 | Harada et al. ................ 359/443 |
| 7,262,912 B2 * | 8/2007 | Wood .......................... 359/459 |
| 2002/0167725 A1 * | 11/2002 | Goto ........................... 359/456 |
| 2004/0240054 A1 * | 12/2004 | Aiura et al. ................. 359/455 |
| 2005/0213245 A1 * | 9/2005 | Katsura et al. .............. 360/125 |
| 2006/0014085 A1 * | 1/2006 | Nakajima et al. ............... 430/7 |
| 2006/0181688 A1 * | 8/2006 | Hoshino et al. ............. 353/122 |
| 2006/0187377 A1 * | 8/2006 | You et al. ..................... 349/64 |
| 2006/0274411 A1 * | 12/2006 | Yamauchi ................... 359/443 |

FOREIGN PATENT DOCUMENTS

| | | |
|---|---|---|
| JP | A 2-262134 | 10/1990 |
| JP | A 4-214547 | 8/1992 |
| JP | A 8-29875 | 2/1996 |
| JP | A 10-26803 | 1/1998 |
| JP | A 10-62870 | 3/1998 |
| JP | A 10-260475 | 9/1998 |
| JP | A 11-174586 | 7/1999 |
| JP | A 2000-352608 | 12/2000 |
| JP | A 2002-311507 | 10/2002 |
| JP | A 2002-540445 | 11/2002 |
| JP | A 2003-66206 | 3/2003 |
| JP | A 2003-262923 | 9/2003 |
| JP | A 2004-309610 | 11/2004 |
| JP | A 2005-17751 | 1/2005 |
| WO | WO 00/57214 | 9/2000 |

* cited by examiner

REFLECTING SCREEN, METHOD OF MANUFACTURING THE SAME, AND REFLECTION-TYPE PROJECTION SYSTEM

BACKGROUND OF THE INVENTION

1. Field of the Invention

The present invention relates to a reflecting screen for observing image light (light of an image) coming from the front by reflecting the light using a reflecting surface, a method of manufacturing the reflecting screen, and a reflection-type projection system.

2. Background Art

In the past, as a reflecting screen of the type as mentioned above, one having a light transmitting diffusion layer provided on the front face side of a clear sheet and a linear Fresnel lens face for reflecting light provided on the rear face side has been known (for example, Patent Document 1). Also, Patent Document 2 discloses a construction of a reflecting screen which controls lowering of a contrast due to natural light and enables to obtain an appropriate viewing angle. Additionally, Patent Document 3 describes a reflecting screen which is composed of a combination of a lenticular lens and a linear Fresnel lens arranged orthogonally to the lenticular lens in the rear face provided with a reflecting portion.

However, there is a need for obtaining higher contrast images, and a need for obtaining images with possibly high brightness even in the case of a low amount of light of the light source on the projection side. Even though it is possible to obtain images with high brightness, elimination of unnecessary surface strong shining is always needed.

Moreover, in the conventional reflecting screens as mentioned above, the manufacturing steps are complex, resulting in increase of the manufacturing cost.

In addition, Patent Document 4 discloses a reflecting screen for observing light projected obliquely from the front by reflecting the light, in which reflecting faces and light absorbing faces are formed in a screen face with a sawtoothed cross section such that faces at which image light arrives and faces at which natural light arrives are formed separately.

However, in the case of the reflecting screen described in the Patent Document 4, it is necessary to manufacture the screen with the reflecting faces and the light absorbing faces being distinctly separated in the screen face along with a sawtoothed cross section. However, it is difficult to form a reflecting face as one side of each tooth portion separately from a light absorbing face as the other side of the tooth portion, thus raising the unit price of manufacture.

Documents Cited:
Patent Document 1: TOKUKAIHEI No. 8-29875, KOHO
Patent Document 2: TOKUKAIHEI No. 10-62870, KOHO
Patent Document 3: TOKUKAI No. 2002-311507, KOHO
Patent Document 4: TOKUKAIHEI No. 2-262134, KOHO

SUMMARY OF THE INVENTION

It is an object to provide a reflecting screen which can produce an image with a high contrast and high brightness but free of strong shining as well as can be manufactured easily, a method of manufacturing the reflecting screen, and a reflection-type projection system.

The present invention is a reflecting screen adapted to reflect image light projected from an image source and including a screen face, comprising: light transmitting portions which can transmit light; and light absorbing portions adapted to absorb light; wherein the light transmitting portions and the light absorbing portions are formed to alternately extend along the screen face; and wherein a reflecting layer adapted to reflect the image light, which has been transmitted through the light transmitting portions, is provided at least on the rear face side of each light transmitting portion.

The present invention is the reflecting screen, wherein each of the light transmitting portions comprises a unit prism shaped portion which in a cross section orthogonal to the screen face has a generally wedge-like shape with a larger width on the image source side than its width on the rear face side and is arranged along the screen face.

The present invention is the reflecting screen, wherein the refractive index of the light absorbing portions is lower than the refractive index of the light transmitting portions.

The present invention is the reflecting screen, wherein each of the light absorbing portions comprises micro-beads adapted to absorb light.

The present invention is the reflecting screen, wherein the light absorbing portions are formed by kneading the micro-beads with a resin having a refractive index lower than the refractive index of the light transmitting portions.

The present invention is the reflecting screen, wherein the reflecting layer is formed only on an apex portion of each wedge-like shape of the unit prism shaped portions.

The present invention is the reflecting screen, wherein each of the unit prism shaped portions has a first prism face and a second prism face, which are unsymmetrical to each other.

The present invention is the reflecting screen, wherein the first prism face is formed of a single face, and wherein the second prism face is formed of two types of faces.

The present invention is the reflecting screen, wherein the first prism face is formed of a single plane, wherein the second prism face is formed of two types of planes comprising a first plane formed near to the rear face, and a second plane formed nearer to the image source than the first plane; wherein the first plane of the second prism face is formed of a plane symmetrical to the first prism face; and wherein the angle defined by the second plane of the second prism face and the normal line to the screen face is larger than the angle defined by the first plane of the second prism face and the normal line to the screen face.

The present invention is the reflecting screen, wherein at least one of anti-glaring, antireflection finish, antistatic treatment, hard-coating, and antifouling is applied to the surface on the side of the image source.

The present invention is the reflecting screen, wherein an anti-regular-reflection layer adapted to reduce the amount of light components of regular reflection is formed on the surface on the side of the image source.

The present invention is the reflecting screen, wherein the haze value due to the anti-regular-reflection layer is in the range of 25% to 90%.

The present invention is the reflecting screen, wherein micro-concavo-convex shapes are formed on the surface of the anti-regular-reflection layer such that light components of regular reflection can be reduced by the micro-concavo-convex shapes.

The present invention is the reflecting screen, wherein the anti-regular-reflection layer comprises a plurality of micro-beads and a binder for fixing the micro-beads thereto; and wherein the micro-beads project from the binder toward the image source so as to form the micro-concavo-convex shapes.

The present invention is the reflecting screen, wherein substantially no flat faces parallel to the screen face are formed in the micro-concavo-convex shapes.

The present invention is the reflecting screen, wherein the anti-regular-reflection layer comprises a lens array composed of micro-unit lens shapes arranged in a one-dimensional or two-dimensional orientation such that light components of regular reflection can be reduced by the lens array.

The present invention is the reflecting screen, wherein the lens array is a lenticular lens array formed by arranging unit lens shapes in a one-dimensional orientation; and wherein the direction along which the unit lens shapes extend is substantially orthogonal to the direction along which the light transmitting portions and the light absorbing portions extend.

The present invention is the reflecting screen, wherein the lens array is a micro-lens array formed by arranging unit lens shapes, with a longitudinal direction, in a two-dimensional orientation; and wherein the longitudinal direction to be defined when the unit lens shapes are observed along the normal direction to the screen is substantially orthogonal to the direction along which the light transmitting portions and the light absorbing portions extend.

The present invention is the reflecting screen, wherein at least one of antistatic treatment, hard-coating, and antifouling is applied to the surface on the image source side of the anti-regular-reflection layer along the surface shape of the anti-regular-reflection layer so as to provide an antistatic, hard-coating, or antifouling function while keeping the function of reducing light components of regular reflection of the anti-regular-reflection layer.

The present invention is the reflecting screen, wherein the reflecting layer has a reflectance of 40% or higher.

The present invention is the reflecting screen, wherein the reflecting layer has a diffuse reflectance Rd in the range of 10% to 70%.

The present invention is the reflecting screen, wherein the diffuse reflectance Rd of the reflecting layer is adjusted in the predetermined range by applying a surface diffusion treatment to the surface thereof.

The present invention is the reflecting screen, wherein the reflecting layer has strength of diffusion effect which varies with the direction.

The present invention is the reflecting screen, wherein the reflecting layer has strength of diffusion effect which is greater in the horizontal direction in the state of using the screen than in the vertical direction in that state.

The present invention is the reflecting screen, wherein the reflecting layer is composed of a combination of a plurality of regions having different values of diffuse reflectance Rd.

The present invention is the reflecting screen, wherein a deforming diffusion layer is adapted to strongly diffuse only the light transmitted in a certain direction.

The present invention is the reflecting screen, wherein the direction of the transmitted light that the deforming diffusion layer strongly diffuses is coincident with the direction along which the light transmitting portions and the light absorbing portions extend.

The present invention is the reflecting screen, wherein the reflecting layer is formed of a reflecting film or reflecting plate with a high reflectance; and wherein the reflecting film or reflecting plate is laminated on the light transmitting portions and the light absorbing portions using an adhesive or cohesive layer.

The present invention is the reflecting screen, wherein a gap between the reflecting film or reflecting plate and the light transmitting portions and light absorbing portions is ½ or less of the width on the reflecting layer side of each light transmitting portion.

The present invention is the reflecting screen, wherein a light diffusion material is incorporated in the adhesive or cohesive layer.

The present invention is the reflecting screen, wherein the reflecting screen can be hoisted when it is not used.

The present invention is the reflecting screen, wherein a combined body comprising a plurality of additional unit prism shaped portions extending along the direction orthogonal to the direction along which the unit prism shaped portions extend and additional light absorbing portions each arranged between each adjacent pair of the additional unit prism shaped portions is laminated on the combined body comprising the plurality of unit prism shaped portions and the light absorbing portions each arranged between each adjacent pair of the unit prism shaped portions.

The present invention is the reflecting screen, wherein each of the light transmitting portions is formed from an ultraviolet curing resin, electron-beam curing resin or radiation curing resin, and the lowering start point of storage elasticity (Tg) in the range of dynamic viscoelasticity of these curing resins is in the range of −60° C. to 25° C. or 60° C. to 150° C. and the storage elasticity in the range of rubber-like elasticity above the glass transition point of these resins is greater than $10^7$ Pa.

The present invention is the reflecting screen, wherein the ultraviolet curing resin, electron-beam curing resin or radiation curing resin, comprises at least one type of urethane acrylates as an oligomer component.

The present invention is the reflecting screen, wherein the light transmitting portions are supported by a base portion, the base portion being formed of PET or PC, and having a thickness of 10 to 188 μm.

The present invention is the reflecting screen, wherein the thickness of the combined body of the light transmitting portions and the light absorbing portions is in the range of 20 to 200 μm.

The present invention is the reflecting screen, wherein the reflecting film or reflecting plate includes a white color film composed of a synthetic resin film selected from the group consisting of PET, modified PET, PEN, PC, PMMA, PE, copolymerized modified PE, PP, and PVC and having a total light reflectance of 30% or higher and a total light transmittance of 50% or lower, and a reflection concealing layer provided on the rear face of the white color film by Al deposition or a silver coating material.

The present invention is the reflecting screen, wherein the surface of the white color film is provided using an ultraviolet curing resin or electron-beam curing resin, or matted by sand blasting.

The present invention is the reflecting screen, wherein the reflection concealing layer is formed by coating a silver coating material exhibiting a surface resistance of $10^{10}\Omega$ or less.

The present invention is the reflecting screen, wherein the adhesive agent or cohesive agent has a light transmittance of 70% or higher.

The present invention is the reflecting screen, wherein the adhesive layer or cohesive layer contains diffusing beads having an average particle diameter of 1 to 20 μm.

The present invention is a method of manufacturing a reflecting screen adapted to reflect image light projected from an image source and including a screen face; the reflecting screen including light transmitting portions which can transmit light, and light absorbing portions adapted to absorb light, wherein the light transmitting portions and the light absorbing portions are formed to alternately extend along the screen face, and wherein a reflecting layer adapted to reflect the image light, which has been transmitted through the light transmitting portions, is provided at least on the rear face side of each light transmitting portion, and each light transmitting portion comprises a unit prism shaped portion which in a cross section orthogonal to the screen face has a generally wedge-like shape with a larger width on the image source side than its width on the rear face side and is arranged along the screen face; and the method comprising the steps of: shaping the unit prism shaped portions with a resin; forming the reflecting layer at portions each corresponding to each apex portion of the generally wedge-like shapes of the formed unit prism shaped portions; and forming the light absorbing portions after forming the reflecting layer.

The present invention is a method of manufacturing a reflecting screen adapted to reflect image light projected from an image source and including a screen face; the reflecting screen including light transmitting portions which can transmit light, and light absorbing portions adapted to absorb light, wherein the light transmitting portions and the light absorbing portions are formed to alternately extend along the screen face, and wherein a reflecting layer adapted to reflect the image light, which has been transmitted through the light transmitting portions, is provided at least on the rear face side of each light transmitting portion, and each light transmitting portion comprises a unit prism shaped portion which in a cross section orthogonal to the screen face has a generally wedge-like shape with a larger width on the image source side than its width on the rear face side and is arranged along the screen face; and the method comprising the steps of: shaping the unit prism shaped portions with a resin; forming the light absorbing portions between each adjacent pair of the formed unit prism shaped portions; and forming the reflecting layer after forming the light absorbing portions.

The present invention is the method, wherein the step of forming the light absorbing portions comprises filling a material for forming the light absorbing portions between each adjacent pair of the unit prism shaped portions by wiping.

The present invention is a reflection-type projection system comprising: an image source adapted to project image light; and a reflecting screen adapted to reflect the image light and including a screen surface; wherein the reflecting screen includes light transmitting portions which can transmit light and light absorbing portions adapted to absorb light, and the light transmitting portions and the light absorbing portions are formed to alternately extend along the screen face; wherein a reflecting layer adapted to reflect the image light, which has been transmitted through the light transmitting portions, is provided on the rear face side of each light transmitting portion; and wherein the image light is substantially linearly polarized light, and the polarization direction of the image light is substantially coincident with the direction along which the light transmitting portions and the light absorbing portions extend.

The present invention is the reflection-type projection system, wherein each of the light transmitting portions comprises a unit prism shaped portion which in a cross section orthogonal to the screen face has a generally wedge-like shape with a larger width on the image source side than its width on the rear face side and is arranged along the screen face orthogonally to the polarization direction of the image light.

The present invention is the reflection-type projection system, wherein the reflecting screen further includes a polarizing layer which is provided nearer to the image source than the light transmitting portions and is adapted to adjust a state of polarization of light passing through the polarizing layer to linearly polarized light of a predetermined polarization direction; and wherein the predetermined polarization direction to be adjusted by the polarizing layer is substantially coincident with the polarization direction of the image light.

The present invention is the reflection-type projection system, wherein the reflecting layer is formed of a polarized-light reflecting material for selectively reflecting only the light which was polarized in a certain direction; and wherein the polarization direction to be reflected selectively by the polarized-light reflecting material is substantially coincident with the polarization direction of the image light.

The present invention is the reflection-type projection system, further comprising: an illumination light source for illuminating at least a space in which the reflecting screen is provided; wherein the illumination light of the illumination light source is substantially linearly polarized light; and wherein the polarization direction of the illumination light is substantially orthogonal to the polarization direction of the image light.

The present invention is a reflecting screen adapted to reflect image light projected from an image source and including a screen face, comprising: light transmitting portions which can transmit light, and light absorbing portions adapted to absorb light; wherein the light transmitting portions and the light absorbing portions are formed to alternately extend along the screen face, and a reflecting layer adapted to reflect the image light, which has been transmitted through the light transmitting portions, is provided at least on the rear face side of each light transmitting portion; wherein the reflecting screen further comprises a polarizing layer which is provided nearer to the image source than the light transmitting portions and is adapted to adjust a state of polarization of light passing through the polarizing layer to linearly polarized light in a predetermined polarization direction; and wherein the predetermined polarization direction to be adjusted by the polarizing layer is substantially coincident with the direction along which the light transmitting portions and the light absorbing portions extend.

The present invention is a reflecting screen adapted to reflect image light projected from an image source and including a screen face, comprising: light transmitting portions which can transmit light, and light absorbing portions adapted to absorb light; wherein the light transmitting portions and the light absorbing portions are formed to alternately extend along the screen face, and a reflecting layer adapted to reflect the image light, which has been transmitted through the light transmitting portions, is provided at least on the rear face side of each light transmitting portion; wherein the reflecting layer is formed of a polarized-light reflecting material for selectively reflecting only the light which was polarized in a certain direction; and wherein the polarization direction to be reflected selectively by the polarized-light reflecting material is substantially coincident with the direction along which the light transmitting portions and the light absorbing portions extend.

The present invention is the reflecting screen, wherein each of the light transmitting portions comprises a unit prism shaped portion which in a cross section orthogonal to the screen face has a generally wedge-like shape with a larger width on the image source side than its width on the rear face side and is arranged in large numbers along the screen face orthogonally to the polarization direction of the image light.

According to the present invention, the following effects can be obtained:

(1) Since the reflecting screen comprises the light transmitting portions which can transmit light, and light absorbing portions adapted to absorb light, wherein the light transmitting portions and the light absorbing portions are formed to alternately extend along the screen face, and wherein a reflecting layer adapted to reflect the image light, which has been transmitted through the light transmitting portions, is provided to the screen, unnecessary natural light can be absorbed as well as high contrast images can be displayed.

(2) Since the reflecting screen comprises unit prism shapes formed by arranging them in large numbers along the screen face, and the reflecting layer formed on the rear face side adapted to reflect image light passing through the unit prism shapes, the image light can be reflected with good efficiency in the direction required to observe.

(3) Since the refractive index of the light absorbing portions is lower than the refractive index of the material for forming the light transmitting portions, total reflection of image light can be made at each interface between the unit prism shapes and the light absorbing portions, thus minimizing loss of reflection and enabling to present bright images.

(4) Since each of the light absorbing portions comprises micro-beads adapted to absorb light, an adequate effect of absorbing natural light can be obtained with ease and securely.

(5) Since the light absorbing portions are formed by kneading the micro-beads with a resin having a refractive index lower than the refractive index of the material for forming the light transmitting portions, the micro-beads can be fixed without forming a rear face protecting layer.

(6) The reflecting layer is formed only at portions each corresponding to each apex portion of the wedge-like shapes of the light transmitting portions or unit prism shapes, thus facilitating the production.

(7) Since each of the unit prism shapes has a first prism face and a second prism face, which are unsymmetrical to each other in the arranged direction, any optimal shape can be selected depending on the direction of the image light or natural light to be expected. Accordingly, the image light can be reflected with good efficiency while the natural light can be absorbed with high efficiency.

(8) Since the first prism face is formed of a single face while the second prism face is formed of two types of faces, a shape which is advantageous for reflecting the image light with good efficiency and absorbing the natural light with high efficiency can be obtained.

(9) Since the first prism face is formed of a single plane while the second prism face is formed of two types of planes comprising a first plane and second plane wherein the first plane is formed of a plane symmetrical to the first prism face and wherein the angle defined by the second plane and the normal line to the screen face is larger than the angle defined by the first plane and the normal line to the screen face, the incident angle of natural light relative to the second plane can be lessened, thus causing more natural light to be absorbed. Since the light receiving area facing downward can be widened, the image light can be taken more securely into the unit prism shapes.

(10) Since at least one of anti-glaring, antireflection finish, antistatic treatment, hard-coating, and antifouling is applied to the surface on the side of the image source, a higher quality reflecting screen can be obtained by selecting a proper treatment depending on the environment of use.

(11) Since an anti-regular-reflection layer adapted to reduce the amount of light components of regular reflection is formed on the surface on the side of the image source, shining caused by the image source or illumination light can be prevented, thus enabling to display more bright and clear images.

(12) Since the haze value due to the anti-regular-reflection layer is in the range of 25% to 90%, the shining can be prevented effectively without experiencing whitish appearance.

(13) Since micro-concavo-convex shapes are formed on the surface of the anti-regular-reflection layer such that light components of regular reflection can be reduced by the micro-concavo-convex shapes, the production becomes easy, and the shining can be prevented securely.

(14) Since the anti-regular-reflection layer comprises a plurality of micro-beads and a binder for fixing the micro-beads thereto such that the portions where the micro-beads are fixed to the binder are project toward the image source more than the portions where only the binder is exposed without micro-beads fixed thereto so as to form the micro-concavo-convex shapes, the anti-regular-reflection effect and the diffusion effect can be established optionally by changing the proportion of mixing the micro-beads.

(15) Since substantially no flat faces parallel to the screen face are formed in the micro-concavo-convex shapes, the shining caused by the image source can be prevented securely.

(16) Since the anti-regular-reflection layer comprises a lens array composed of micro-unit lens shapes arranged in a one-dimensional or two-dimensional orientation such that light components of regular reflection can be reduced by the lens array, the shining caused by the image source can be prevented while optionally establishing the visual field.

(17) Since the lens array is a lenticular lens array formed by arranging unit lens shapes in a one-dimensional orientation, and the direction along which the unit lens shapes extend with the same cross section is substantially orthogonal to the direction along which the light transmitting portions and the light absorbing portions extend with the same cross section, the lens array can control the visual field in the direction orthogonal to the direction in which the light transmitting portions can control the visual field.

(18) Since the lens array is a micro-lens array formed by arranging unit lens shapes in a two-dimensional orientation, and the longitudinal direction to be defined when the unit lens shapes are observed along the normal direction to the screen is substantially orthogonal to the direction along which the light transmitting portions and the light absorbing portions extend with the same cross section, the lens array can control the visual field in the direction orthogonal to the direction in which the light transmitting portions can control the visual field.

(19) Since at least one of antistatic treatment, hard-coating, and antifouling is applied to the surface on the image source side of the anti-regular-reflection layer along the surface shape of the anti-regular-reflection layer so as to provide an antistatic, hard-coating, or antifouling function while keeping the function of reducing light components of regular reflection of the anti-regular-reflection layer, a reflecting screen with higher quality can be obtained while preventing the shining caused by the image source by selecting a proper treatment depending on the environment of use.

(20) Since the reflecting layer has a reflectance of 40% or higher, it can display images with significantly high brightness.

(21) Since the reflecting layer has a diffuse reflectance Rd in the range of 10% to 70%, it can perform reflection with high reflecting efficiency and good balance without making the visual field extremely narrow.

(22) Since the diffuse reflectance Rd of the reflecting layer is adjusted in the predetermined range by applying a surface diffusion treatment to the surface thereof, the degree of diffusion of reflected light can be set as desired.

(23) Since the reflecting layer has strength of diffusion effect which varies with the direction, it can widen the visual field while controlling the reflection that would go to the light absorbing portions to a minimum.

(24) Since the reflecting layer has strength of diffusion effect which is greater in the horizontal direction in the state of using the screen than in the vertical direction in that state, it can widen the visual field in the horizontal direction that is required to secure provision of a wider visual field.

(25) Since the reflecting layer is composed of a combination of a plurality of regions having different values of diffuse reflectance Rd, the brightness can be set and controlled as needed in the balance of the front peak brightness which becomes higher as the diffuse reflectance Rd becomes lower and the brightness distribution which tends to be distributed at a wider observing angle as the diffuse reflectance Rd becomes higher.

(26) Since a deforming diffusion layer is adapted to strongly diffuse only the light transmitted in a certain direction, high directivity which becomes strong in the diffusion direction of light can be obtained easily and securely.

(27) Since the direction of the transmitted light that the deforming diffusion layer strongly diffuses is coincident with the direction along which the light transmitting portions and the light absorbing portions extend with the same cross section, even if the deforming diffusion layer is disposed between the reflecting layer and the light transmitting portions and light absorbing portions, the visual field can be widened with high efficiency without the reflected light being absorbed in the light absorbing portions after being strongly diffused by the deforming diffusion layer.

(28) Since the reflecting film or reflecting plate is laminated on the light transmitting portions and the light absorbing portions using an adhesive or cohesive layer, the formation of the reflecting layer can be performed more easily. In addition, the properties of the reflecting layer can be adjusted freely.

(29) Since a gap between the reflecting film or reflecting plate and the light transmitting portions and light absorbing portions is ½ or less of the width on the reflecting layer side of each light transmitting portion, the incidence of reflected light, which is to be reflected again to the light transmitting portions after being reflected by the reflecting layer, on the light absorbing portions can be prevented, thus also preventing lowering of the reflecting efficiency as a screen.

(30) Since a light diffusion material is incorporated in the adhesive or cohesive layer, the visual field can be widened with ease.

(31) Since the reflecting screen can be hoisted when it is not used, the screen is less susceptible to the effect of natural light and also it can be a reflecting screen which is able to be used in more various situations.

(32) Since the second unit prism shapes arranged in the direction orthogonal to the direction along which the unit prism shapes are arranged are formed nearer to the image source than the unit prism shapes, natural light coming in various directions can be removed effectively.

(33) Since the method comprises the steps of shaping the unit prism shapes; forming the reflecting layer only at portions each corresponding to each apex portion of the generally wedge-like shapes of the formed unit prism shapes, and forming the light absorbing portions after forming the reflecting layer, the formation of the light absorbing portions requires only to form the light absorbing portions on the whole surface of the rear face, thus facilitating the production of the reflecting screen.

(34) Since the method comprises the steps of shaping the unit prism shapes; forming the light absorbing portions between each adjacent pair of the formed unit prism shapes; and forming the reflecting layer after forming the light absorbing portions, the formation of the reflecting layer requires only to form the reflecting layer on the whole surface of the rear face, thus facilitating the production of the reflecting screen.

(35) Since the step of forming the light absorbing portions comprises filling a material for forming the light absorbing portions between each adjacent pair of the unit prism shapes by wiping, the filling can be carried out securely.

According to the present invention, the following effects can be further obtained:

(36) Since the image light is substantially linearly polarized light, and the polarization direction of the image light is substantially coincident with the direction along which the light transmitting portions and the light absorbing portions extend while keeping the same cross section, the image light can be reflected with higher efficiency. This is because a difference of the refractive index is provided between the light transmitting portions and the light absorbing portions, thus the reflectance varies with the polarization direction of light to be incident on the interface. The polarization direction of the image light becomes S-type polarization relative to the interface, thus being of high reflectance. Therefore, the proportion of incidence and loss of the image light on the light absorbing portions can be reduced to a minimum.

(37) Since each of the light transmitting portions has a generally wedge-like shape with a larger width on the image source side than its width on the rear face side and is arranged in large numbers along the screen face in the direction orthogonal to the polarization direction of the image light, unnecessary natural light can be absorbed and high contrast images can be displayed.

(38) Since the predetermined polarization direction to be adjusted by the polarizing layer is substantially coincident with the polarization direction of the image light, it can be prevented that natural light having polarization directions not coincident with the polarization direction of the image light reaches the reflecting layer, thus high contrast images can be displayed.

(39) The polarization direction to be reflected selectively by the polarized-light reflecting material is substantially coincident with the polarization direction of the image light. High contrast images can be obtained without reflecting natural light not coincident with the polarization direction of the image light.

(40) Since the polarization direction of the illumination light is substantially vertical to the polarization direction of the image light, it becomes possible to clearly discriminate the image light and the illumination light, reflect only the illumination light, and make the image light observable, thus even in a bright room with an interior lighting being switched on, high contrast images can be displayed.

DETAILED DESCRIPTION OF THE INVENTION EXAMPLES

First Embodiment

An object to obtain a reflecting screen and a reflection-type projection system which enable to obtain images with high contrast and high brightness but free of strong shining was realized in a readily manufactured form by arranging unit prism shapes in large numbers and providing light absorbing portions between each adjacent pair of the unit prism shapes.

Example 1-1

Figure 1:
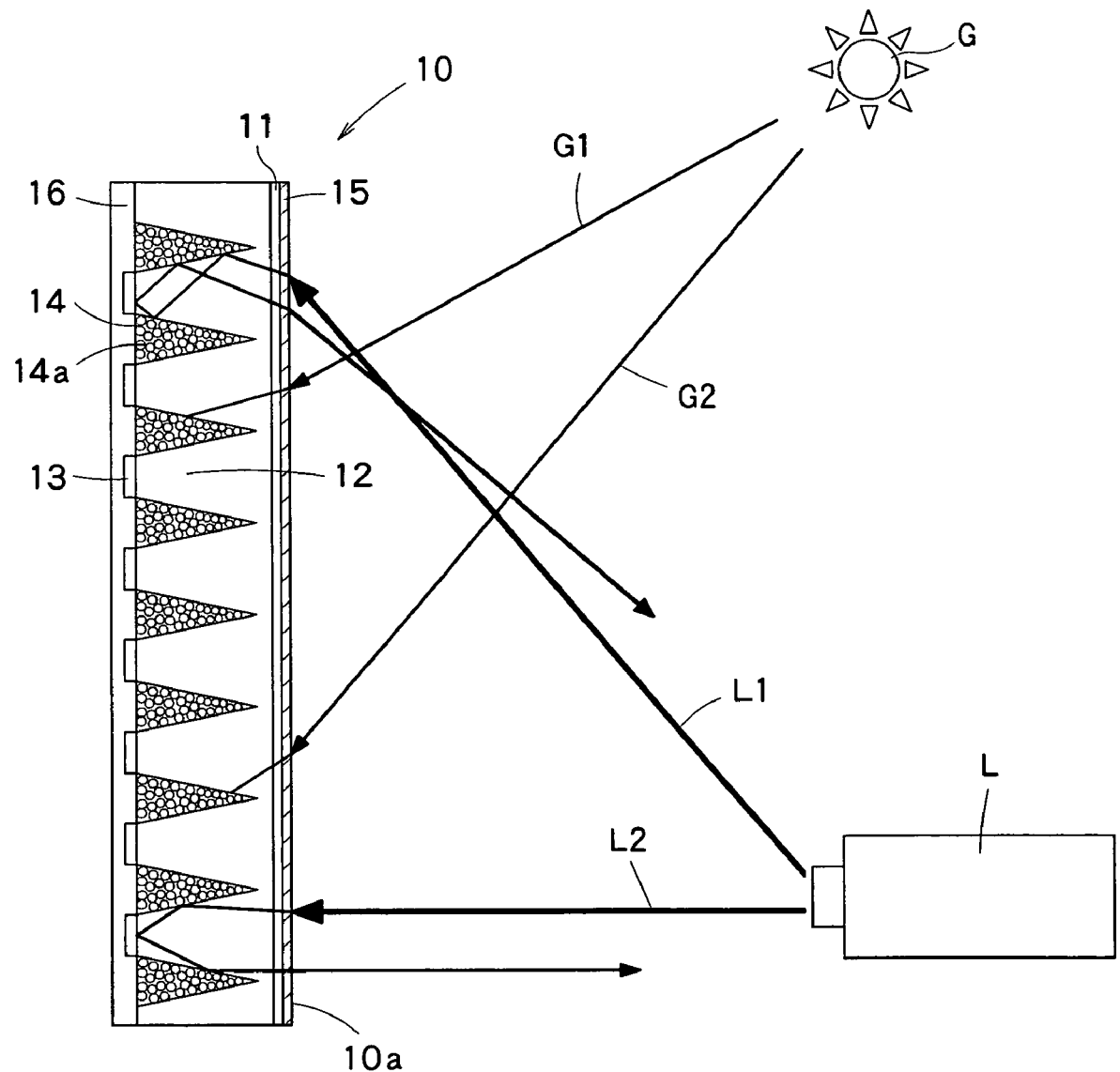
FIG. 1 is a cross section showing a reflecting screen of an Example 1-1 of a first embodiment of the present invention.

FIG. 1 is a cross section illustrating a reflecting screen 10 of an Example 1-1. For the purpose of explanation, each of the drawings including FIG. 1 is emphasized appropriately in sizes, shapes or the like of each portion. In particular, FIG. 1 depicts schematically an interior lighting G, an image source L, and a reflecting screen 10 collectively, in which the respective positional relations are different from actual ones, and other expressions, for example, incident angles of light and like, which differ from actual sizes or dimensions, will be included in the description given below.

The reflecting screen 10 of this example is a screen which has been developed such that a projector optical engine portion (image source) L for projecting image light is installed lower than the center of the screen 10 so as to take a position from which the image light is projected obliquely and upwardly, and most of ambient light is incident on the screen from above. In such a construction, the image light coming from below is reflected to an observer with high efficiency, and unnecessary light coming from above is absorbed selectively by light absorbing portions described below, thereby providing a reflecting screen for use in an extremely high contrast front projector.

In FIG. 1, a vertical cross section is shown, in which the screen is in a state of use.

As shown in FIG. 1, the reflecting screen 10, which reflects image light L1, L2 projected from the image source L, has a screen face 10a, and includes a base portion 11, light transmitting portions 12 provided on the base portion 11 and adapted to transmit light, and light absorbing portions 14 adapted to absorb light. Each of the light transmitting portions 12 comprises a unit prism-shaped portion (or simply referred to as a unit prism shape) 12 which in a cross section orthogonal to the screen face 10a has a generally wedge-like shape with a larger width on the side of the image source L than its width on the rear face side and is arranged in large numbers along the screen face 10a.

Each unit prism shaped portion 12 extends linearly along the screen face 10a, and each light absorbing portion 14 disposed between each adjacent pair of the unit prism shaped portions 12 and having a triangular cross section also extends along the screen face 10a. Thus, in FIG. 1, the unit prism shaped portions 12 and light absorbing portions 14 are arranged alternately.

A reflecting layer 13 is provided on the rear face side of each unit prism shaped portion 12, and a rear face protecting layer 16 is provided on the rear face side of the reflecting layer 13 and the light absorbing portions 14. Additionally, a front face treating layer 15 is provided on the side of the image source L of the base portion 11.

In this case, a reflection-type projection system is constructed with the reflecting screen 10 and the image source L.

The base portion 11 serves as a base material required for forming the unit prism shaped portions 12, and constitutes a light transmitting portion formed of a resin sheet or film made from acrylic, polycarbonate, or polyethylene terephthalate resins. In this example, an acrylic resin is used for forming the base portion 11. Optionally, the base portion 11 may be tinted with a dye of a gray color for example, or a pigment to reduce its transmittance to a predetermined value as desired.

In the cross section of FIG. 1, each unit prism shape 12 has a generally wedge-like shape having a larger width on the image source side than its width on the rear face side. The unit prism shapes 12 are arranged in large numbers along the screen face (vertically in FIG. 1). Each of the unit prism shapes 12 is symmetrical in the vertical direction about its center line, and each upper slope or lower slope of the unit prism shape 12 defines an angle of 5° relative to the normal line to the screen face. Each apex portion has a width of 40 μm, and the height from the bottom face to the apex portion is 200 μm. The unit prism shapes 12 are formed of an ultraviolet (UV) curing resin having a refractive index of 1.56. The term "screen face" means a face that will constitute a plane of a screen when viewing it as the entire body of the screen, and is used as the same definition also in the description below and the claims.

The reflecting layer 13 is provided only at portions each corresponding to each apex portion of the unit prism shapes 12, and serves as a layer for reflecting image light and returning it toward the front face (or the image source).

The reflecting layer 13 of this example is formed by coating the apex portion of each unit prism shape 12 with a highly reflective silver color paint, and the reflectance of the paint used is 62.7% as the total light reflectance Rt and 39.1% as the diffuse reflectance Rd.

Each of the light absorbing portions 14 serves as a portion adapted to absorb light to be produced between each adjacent pair of the unit prism shapes 12. Each light absorbing portion 14 of this example is formed by filling it fully with black color beads 14a. These black color beads 14a are micro-beads adapted to absorb light, and voids formed between these beads in the light absorbing portion 14 define a space. Such a construction enables the light absorbing portions 14 to deform with ease, and advantageously imparts flexibility to the reflecting screen 10, which flexibility will be necessary to make the same screen of a hoist type.

The front face treating layer 15 is a layer which was subjected to various surface treatments, such as an anti-glaring, antireflection finish, antistatic treatment, hard-coating, antifouling or the like. In this example, the layer 15 was subjected to the antireflection finish. The treatment applied to the front face treating layer 15 may be selected properly depending on the needs.

The rear face protecting layer 16 is used as a layer for covering the entire surface to hold the black color beads filled in the light absorbing portions 14. If the rear face protecting layer 16 were not used, it would be difficult to continue to stably hold in position these beads filled in each absorbing portion 14 in a space between each adjacent pair of the unit prism shapes 12. Therefore, in this example, the rear face protecting layer 16 was formed by dropping a UV curing resin onto the whole surface of the rear face, covering the surface with the resin, and then curing the resin with UV irradiation. Other than using the UV curing resin, the black color beads may be fixed by attaching an adhesive tape onto the beads. Such fixation is more advantageous for making a hoist type screen because it enhances the flexibility.

Next, a manufacturing method of the reflecting screen 10 of this example will be described.

(Step of Shaping the Unit Prism Shapes)

First, an ionizing radiation curing resin is coated on the base portion 11, and the unit prism shapes 12 are shaped by curing resin using irradiation of an ionizing radiation with a suitable pattern pressed against the base portion 11. As the ionizing radiation curing resin used for the step of shaping the unit prism shapes, it is preferred to use a photo-crosslinkable type resin which mainly contains UV curing type and electron-beam curing type resins, and multi-functional monomers, such as acrylates, epoxy-acrylates, silicon-aclylates, siloxanes and the like. The term "ionizing radiation" refers to a radiation, selected among electromagnetic waves and charged particle beams, which has an energy quantum able to polymerize and crosslink molecules. Usually, a UV radiation or electron beam is used as the ionizing radiation.

Rather than employing the ionization radiation curing, the formation of the unit prism shapes 12 may be conducted by a heating melt extrusion molding using an acrylic resin, PET (polyethylene terephthalate) resin or the like.

(Step of Forming the Reflecting Layers)

After forming the unit prism shapes 12, the reflecting layer 13 is formed on each apex portion of the wedge-like shapes of the unit prism shapes 12 by employing a gravure reverse coating. The silver color paint used as the reflecting layer 13 is coated on each apex portion such that the film thickness of the paint will be about 20 μm. Coating the paint up to this thickness can provide the aforementioned reflectance.

Since each apex portion of the unit prism shapes 12 is projecting, the formation of each reflecting layer 13 only on the corresponding apex portion is carried out with ease, while preventing the silver color paint from attaching onto each valley-shaped portion between the unit prism shapes 12, i.e., the place where each light absorbing portion 14 is to be formed.

Other than this method of forming the reflecting layer 13, screen printing, ink-jet coating, deposition (it is preferred to use a high reflectance metal, such as aluminum, silver, chromium or the like) may be used.

Also, other than the silver color paint used for forming the reflecting layer 13, paints, such as frosted white color type paints for forming a matted surface after coated, gloss white color type paints which will exhibit strong surface shining after coated, silver color type (metallic) paints, and those in which mica or beads are suitably blended, may be used. The suitable selection of these materials enables to control the area of observation, brightness, and the effect of preventing strong shining caused by a light source.

(Step of Forming the Light Absorbing Portions)

Following the step of forming the reflecting layers, the black color beads 14a are dispersed on the whole surface on the rear face side of the unit prism shapes 12 on which each reflecting layer 13 has been formed. In order to evenly filling the black color beads 14a into the spaces between the unit prism shapes 12, squeezing (wiping) is conducted. Preferably, the diameter of the black color beads is approximately 1 to 10 μm. The diameter smaller than 1 μm tends to make scraping difficult, while the diameter larger than 10 μm may cause difficulty in filling the black color beads 14a into the spaces between the unit prism shapes 12 and make the filling insufficient. This step of forming light absorbing portions can produce such light absorbing portions 14 that can block natural light sufficiently.

Since each reflecting layer 13 has already been formed on each apex portion of the unit prism shapes 12, the light absorbing portions 14 may be attached to, even the whole surface of, the rear face, thus facilitating the step of forming the light absorbing portions.

While in this example the black color beads are supplied to only the spaces between the unit prism shapes 12 as shown in FIG. 1 by carrying out squeezing, the surface of each reflecting layer 13 (or the whole surface of the rear face) may also be covered with the black color beads.

(Step of Forming the Rear Face Protecting Layer)

After the formation of the light absorbing portions 14, a UV curing resin is dropped onto the light absorbing portions 14 in a manner of covering the whole surface of the rear face, followed by UV irradiation curing to form the rear face protecting layer 16.

(Step of Forming the Front Face Treating Layer)

Finally, the front face treating layer 15 is formed on the most front surface on the front face side. In this example, the front face treating layer 15 is formed by laminating an antireflection sheet, to which an antireflection finish is applied, on the surface.

In this way, the reflecting screen 10 is obtained through all the steps above.

In the aforementioned reflecting screen 10, as shown in FIG. 1, image light L1, L2 projected from the image source L is guided through the unit prism shapes 12, and then totally reflects on an interface between each unit prism shape 12 and each corresponding light absorbing portion 14. Since each light absorbing portion 14 contains black color beads filled therein and voids between the beads make a space, the refractive index of the light absorbing portions 14 is lower than that of the unit prism shapes 12. Accordingly, light which is incident on the interface at an angle larger than the critical angle will totally reflect.

Thereafter, the image light which totally reflected on the interface between each unit prism shape 12 and each corresponding light absorbing portion 14 reaches the reflecting layer 13 and is then reflected by the layer 13, followed by making further total reflection and the like, thereafter returned toward an observer as a visible light.

On the other hand, natural light G1, G2 coming from an interior lighting G or the like located above the reflecting screen 10 has a larger incident angle relative to the reflecting screen 10, thus having a smaller incident angle at the interface between each unit prism shape 12 and each corresponding light absorbing portion 14, thereby containing a larger amount of components not exceeding the critical angle, thus being transmitted through the light absorbing portion 14 without generating total reflection, then being absorbed in the black color beads. Accordingly, the proportion of the natural light which will return to a point of observation can be significantly reduced.

In fact, upon projection of image light onto the reflecting screen 10, the projected image had a sufficiently high reflectance while the natural light appreciably absorbed.

As described above, according to this example, images with a high contrast, high brightness but free of strong shining can be obtained, as well as simple manufacture of the reflecting screen 10 can be provided as mentioned above.

Example 1-2

Figure 2:
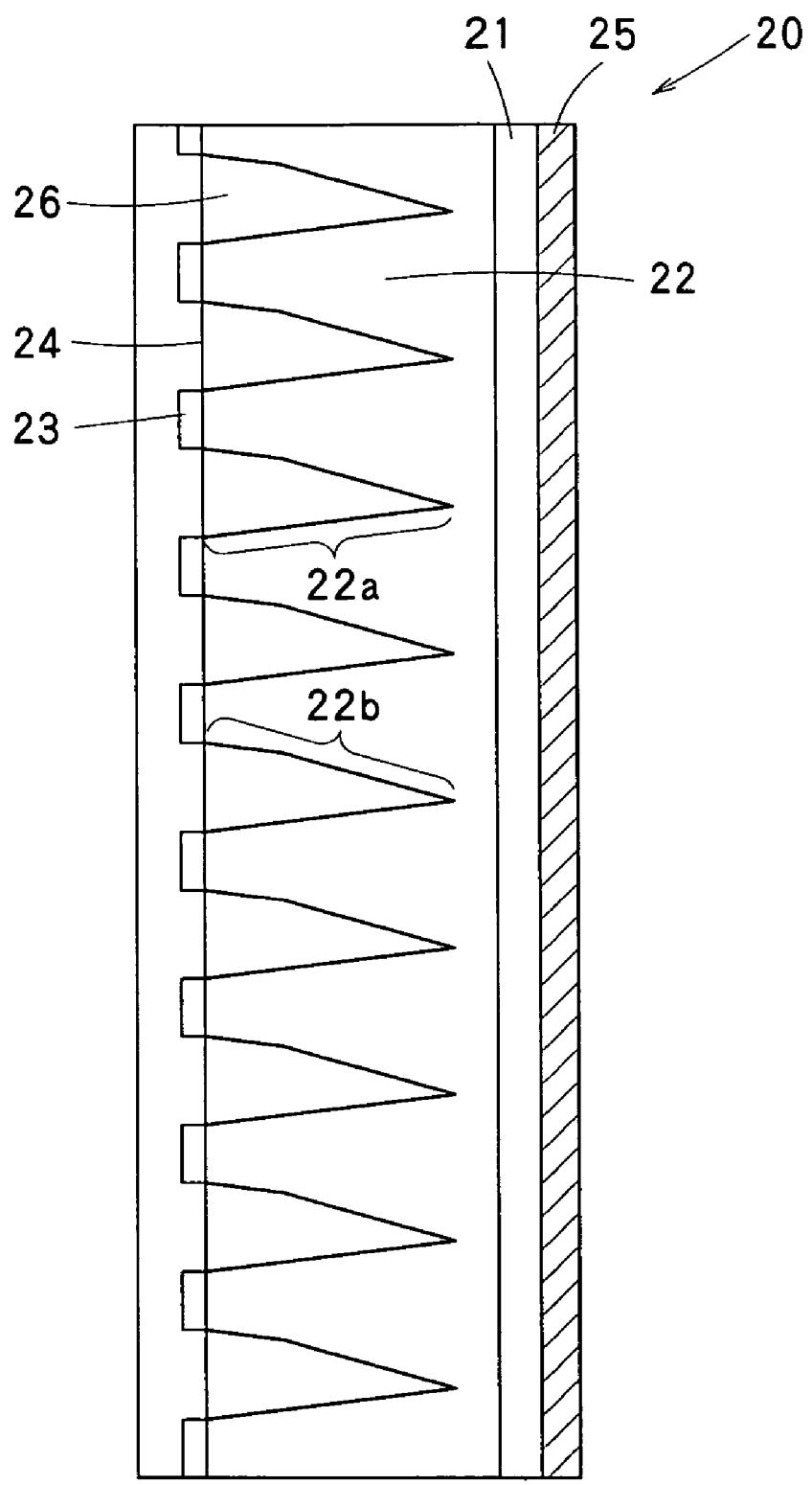
FIG. 2 is a cross section showing a reflecting screen of an Example 1-2 of the first embodiment of the present invention.

FIG. 2 is a cross section of a reflecting screen 20 of an Example 1-2.

This Example 1-2 includes unit prism shapes 22 with a modification of the unit prism shapes 12 of the Example 1-1. Accordingly, parts performing the same functions as those of Example 1-1 are denoted by the same numerals, and repeated descriptions will be omitted appropriately.

Figure 3:
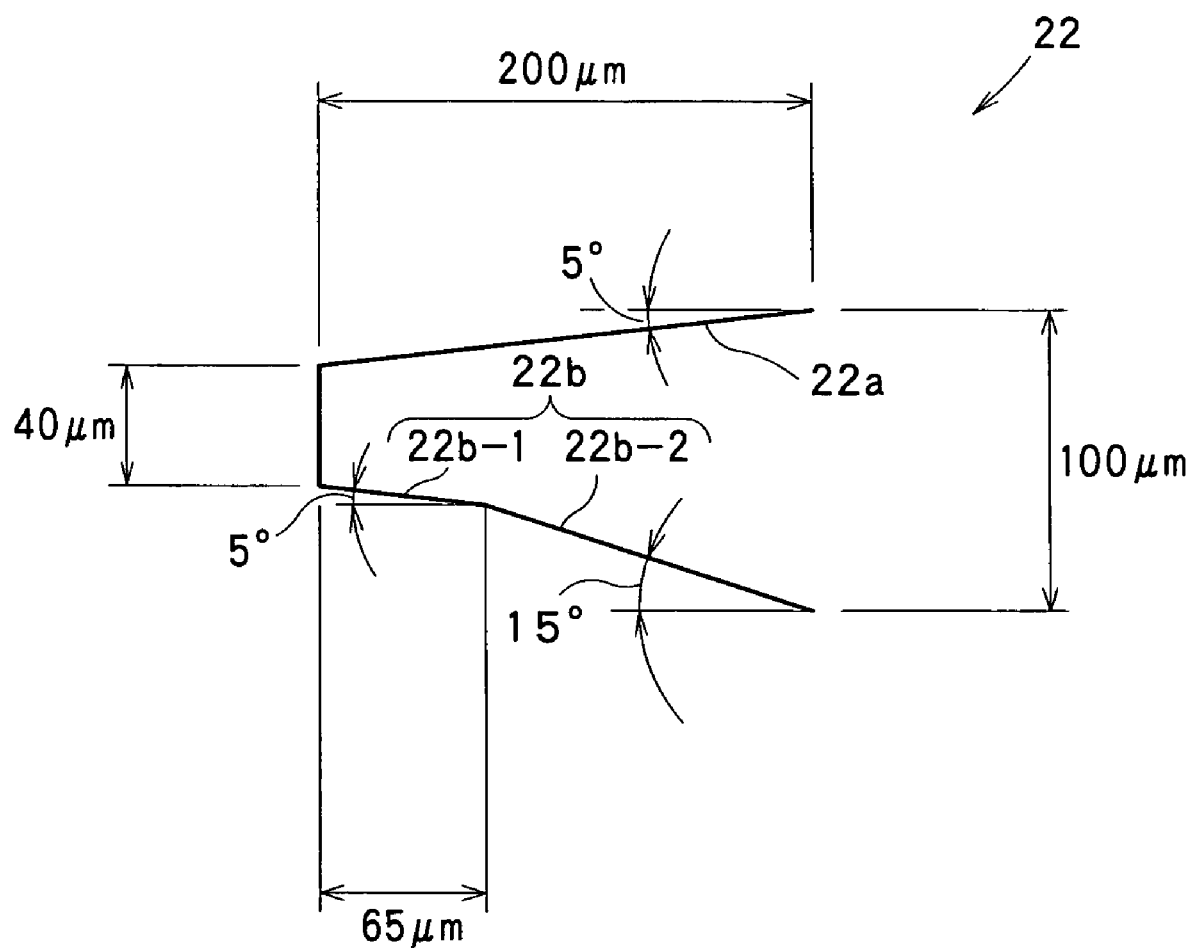
FIG. 3 is a diagram showing a specific shape of each unit prism shape of the first embodiment of the present invention.

FIG. 3 is a diagram showing a specific shape of each unit prism shape 22.

Each unit prism shape 22 is unsymmetrical in its arranged direction (in the vertical direction in use) about its center line, and has an upper first prism face 22a and a lower second prism face 22b.

The first prism face 22a is formed of a single plane, and defines 5° relative to the normal line to the screen face.

The second prism face 22b has two types of planes: a first plane 22b-1 formed near to the rear face, and a second plane 22b-2 formed nearer to the image source than the first plane 22b-1.

The first plane 22b-1 is formed of a portion of the second prism face 22b which is symmetrical to the first prism face 22a about the center line of the first plane 22b-1 and the first prism face 22a, and defines 5° relative to the normal line to the screen face.

The angle defined by the second plane 22b-2 and the normal line to the screen face is 15° which is larger than the angle defined by the first plane 22b-1 and the normal line to the screen face.

Each of the unit prism shapes 22 has an apex with a width of 40 µm, a height between the bottom face and the apex of 200 µm, and a width on the front face side of 100 µm.

In this example, the provision of the relatively large angle defined by the second plane 22b-2 is intended to reduce the incident angle of natural light relative to the second plane 22b-2, thus increasing the amount of natural light which can reach light absorbing portions 24 without generating total reflection at the second plane 22b-2. Also, the provision of the relatively large light receiving portion which faces downwardly makes easier incidence of image light coming from the lower image source.

Figure 4:
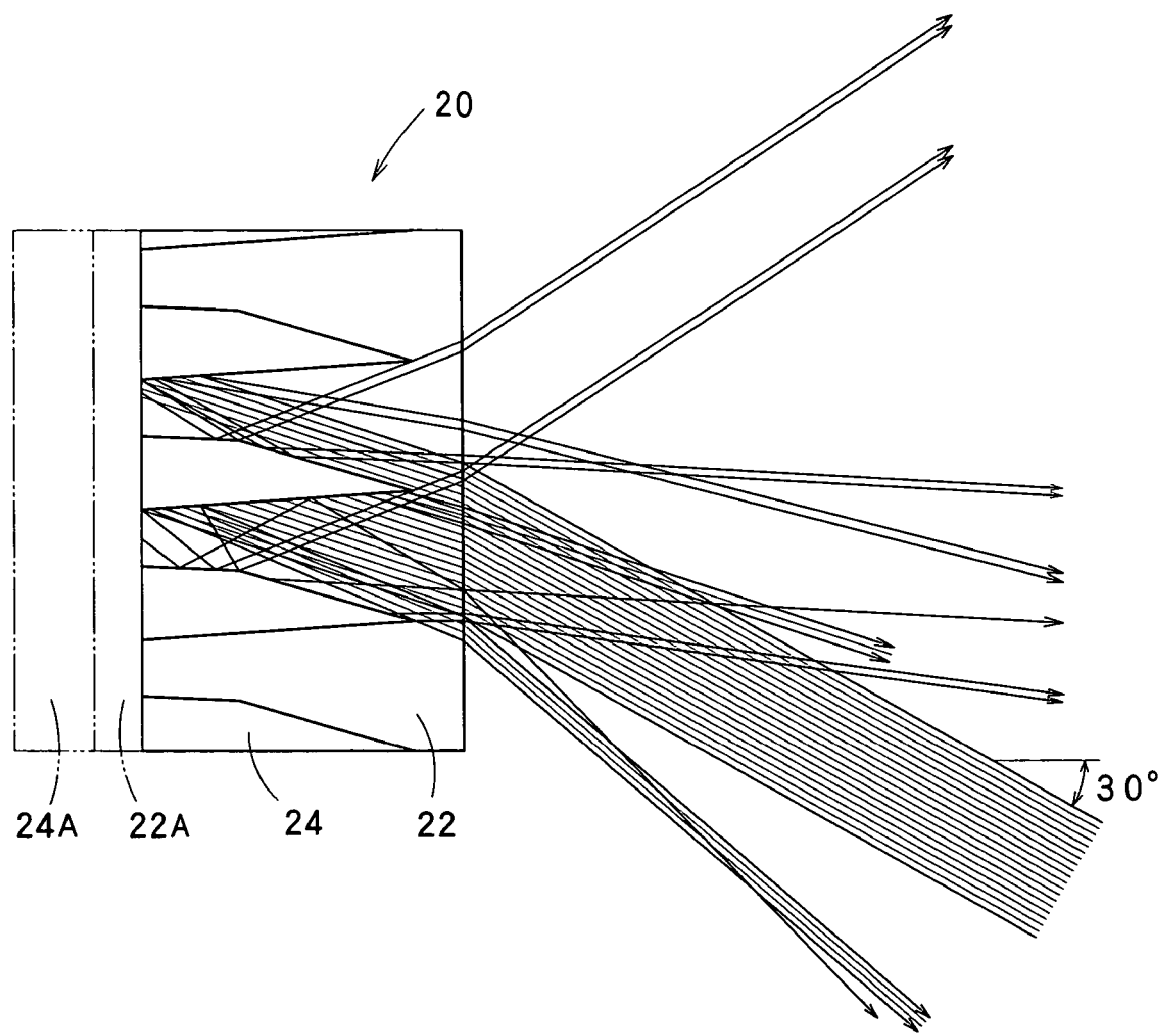
FIG. 4 is a diagram showing a case in which image light is projected from below at an incident angle of 30 degrees relative to the reflecting screen of the Example 1-2 of the first embodiment of the present invention.

FIG. 4 is a diagram showing a case in which image light is projected from below at an incident angle of 30 degrees toward the reflecting screen 20 of the Example 1-2.

Figure 5:
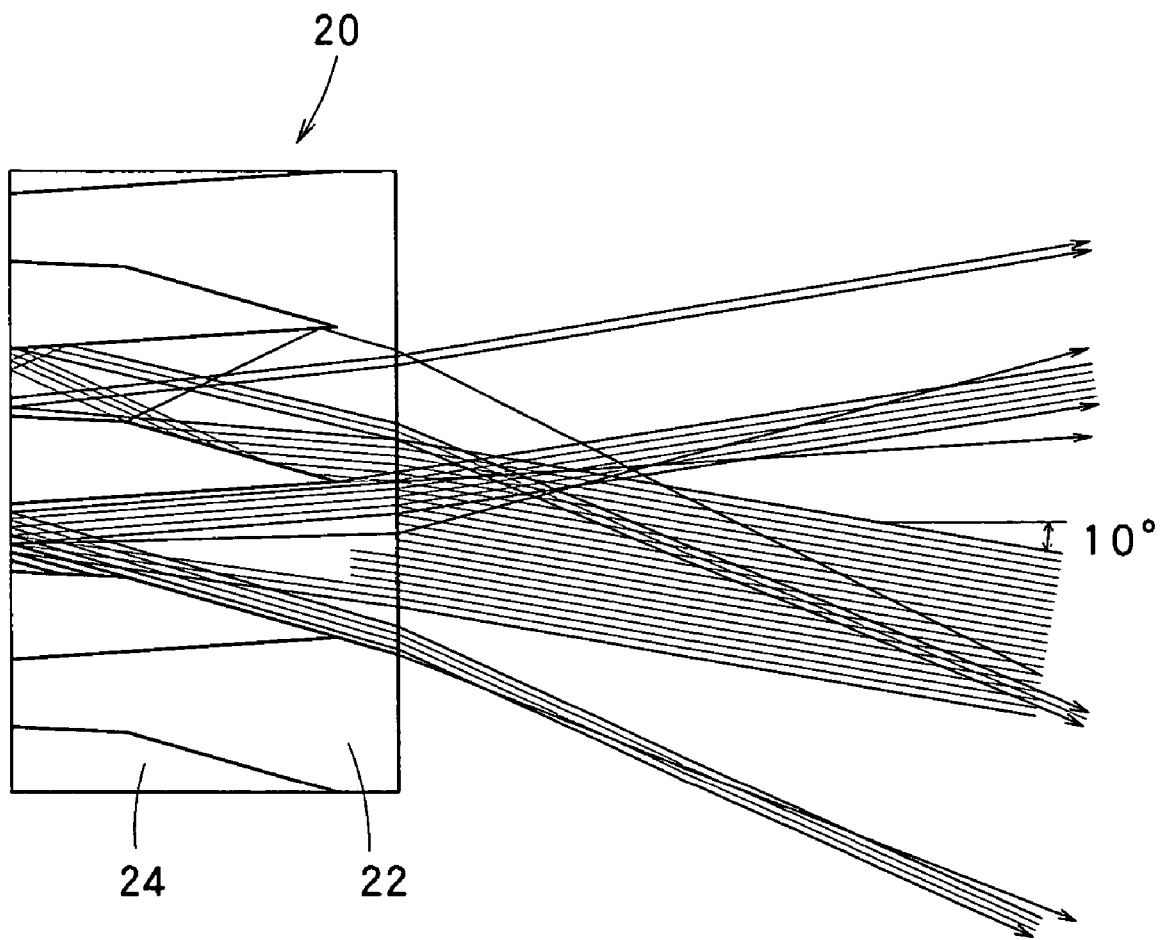
FIG. 5 is a diagram showing a case in which image light is projected from below at an incident angle of 10 degrees relative to the reflecting screen of the Example 1-2 of the first embodiment of the present invention.

FIG. 5 is a diagram showing a case in which image light is projected from below at an incident angle of 10 degrees toward the reflecting screen 20 of the Example 1-2.

Figure 6:
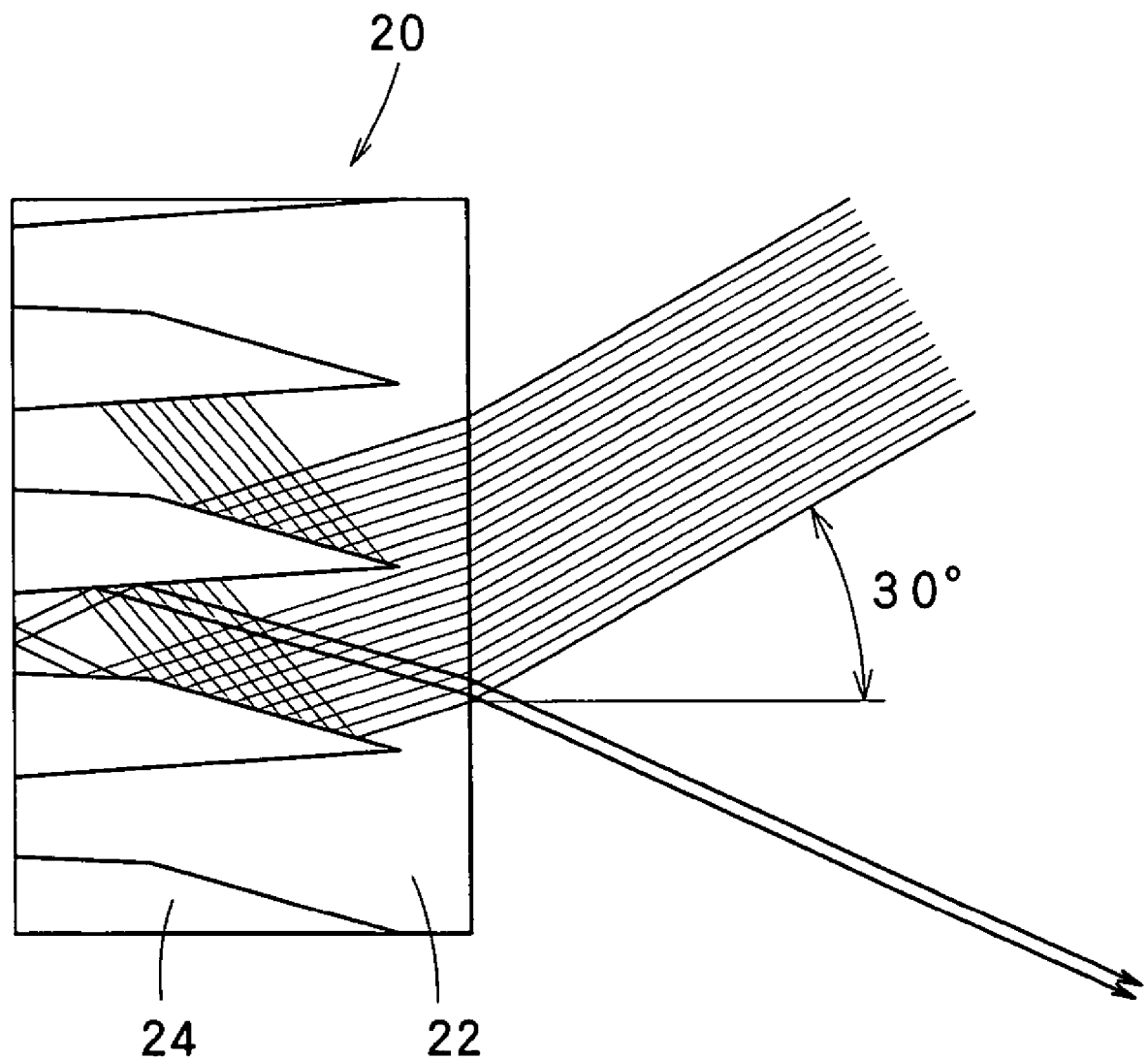
FIG. 6 is a diagram showing a case in which natural light arrives from above at an incident angle of 30 degrees relative to the reflecting screen of the Example 1-2 of the first embodiment of the present invention.

FIG. 6 is a diagram showing a case in which natural light arrives from above at an incident angle of 30 degrees toward the reflecting screen 20 of the Example 1-2.

For simplification, in FIGS. 4 to 6, the base portion 21 is not shown as an independent layer, and the front face treating layer 25 is omitted.

It can be seen that while the image light coming from below is reflected toward an observation area with moderate diffusion (FIGS. 4, 5), most of natural light coming from above is absorbed and not reflected from the screen (FIG. 6).

The angular dependency of reflectance is evaluated for the reflecting screen 20 of the Example 1-2.

Figure 7:
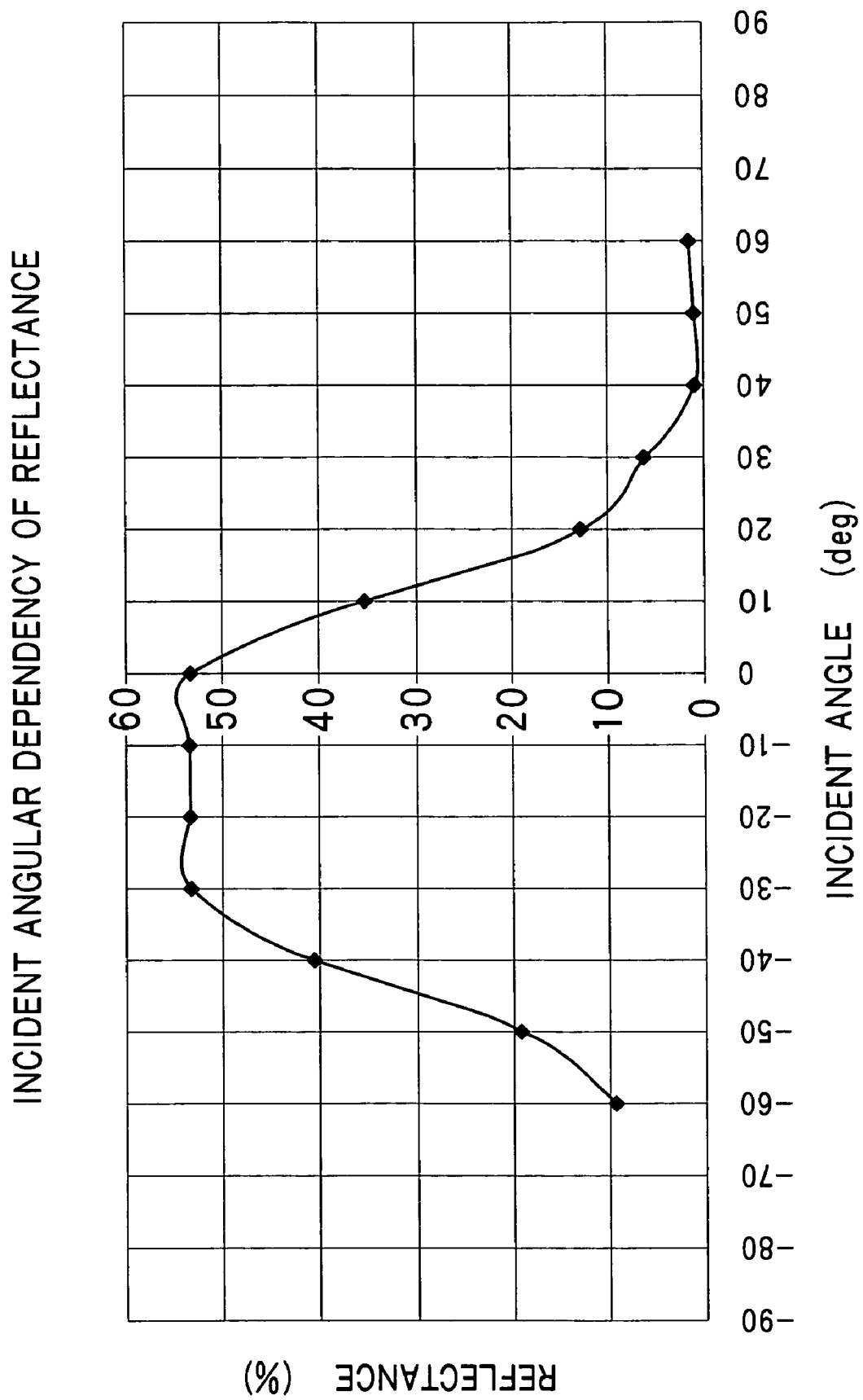
FIG. 7 is a graph representing evaluation results of angular dependency of reflectance of the reflecting screen of the Example 1-2 of the first embodiment of the present invention.

FIG. 7 shows results of evaluation on the angular dependency of reflectance of the reflecting screen 20 in the Example 1-2.

In FIG. 7, the positive (+) side on the horizontal axis shows reflectance of incident light coming from above the screen, and the negative (−) side shows reflectance of incident light coming from below the screen. The projection angle of a usual front projector is set to provide an incident angle of about 0° in the vicinity of the lower end of the screen, and an incident angle of about −30° at the upper end. In the graph of FIG. 7, the incident angle of image light from the projector corresponds to a range of from −30° to 0°, and it is apparently seen that a significantly high contrast is maintained in this range. The reflectance of natural light coming from above corresponds to a range on the positive (+) side of the horizontal axis in FIG. 7. In the range corresponding to the incident angle of natural light, the reflectance of light coming from above with an incident angle exceeding 20° is smaller than 10%, exhibiting a sufficient blocking property of natural light.

According to this example, the addition of the second plane 22b-2 can enhance the effect of reflecting image light while suppressing reflection of natural light coming from above.

Thus, images with a higher contrast and higher brightness but free of strong shining can be observed.

Example 1-3

Figure 8:
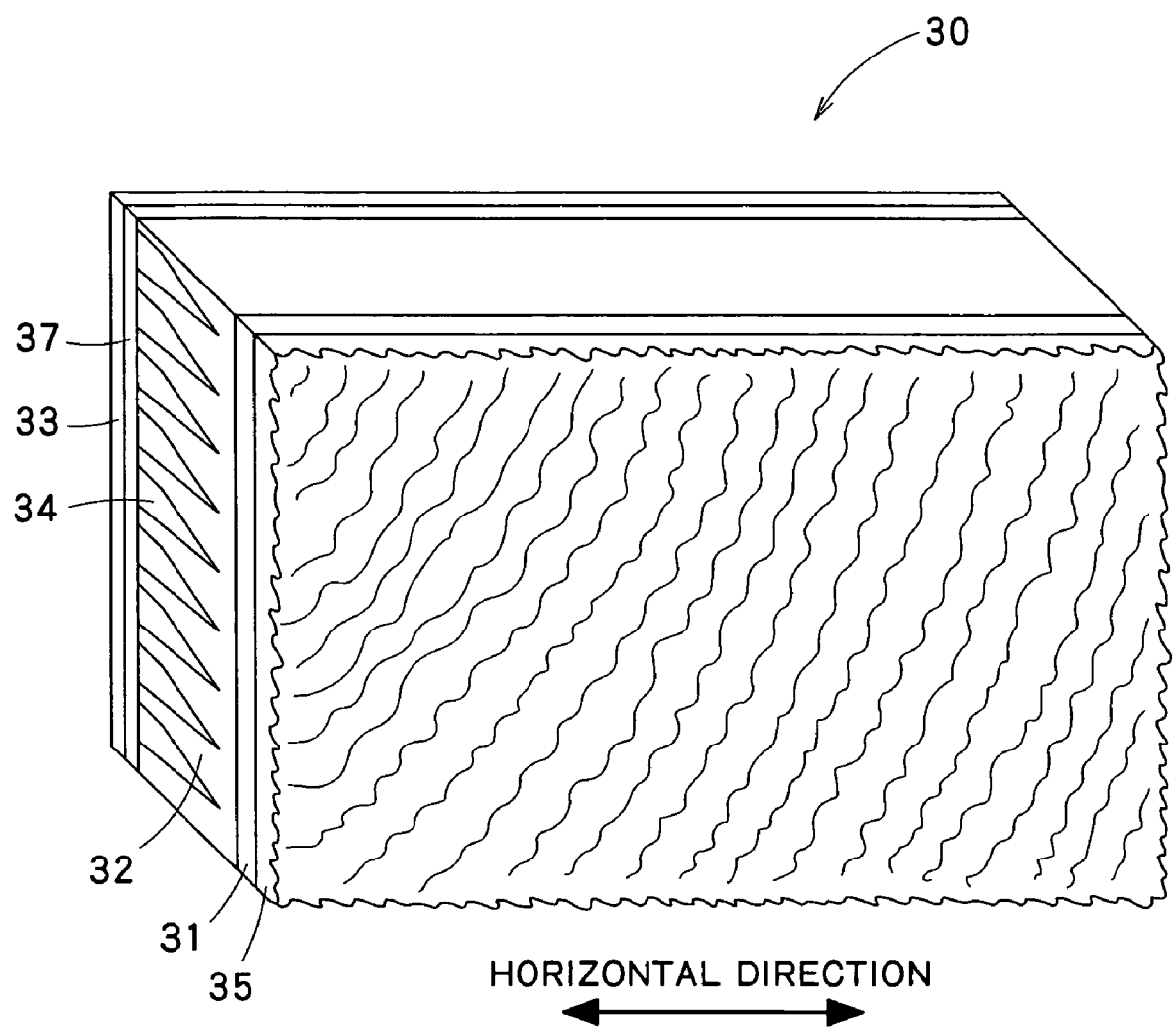
FIG. 8 is a perspective view showing a reflecting screen of an embodiment 1-3 of the first embodiment of the present invention, which is seen from above on the side of the image source.

FIG. 8 is a perspective view showing a reflecting screen 30 of an Example 1-3, which is seen from above on the side of the image source.

Figure 9:
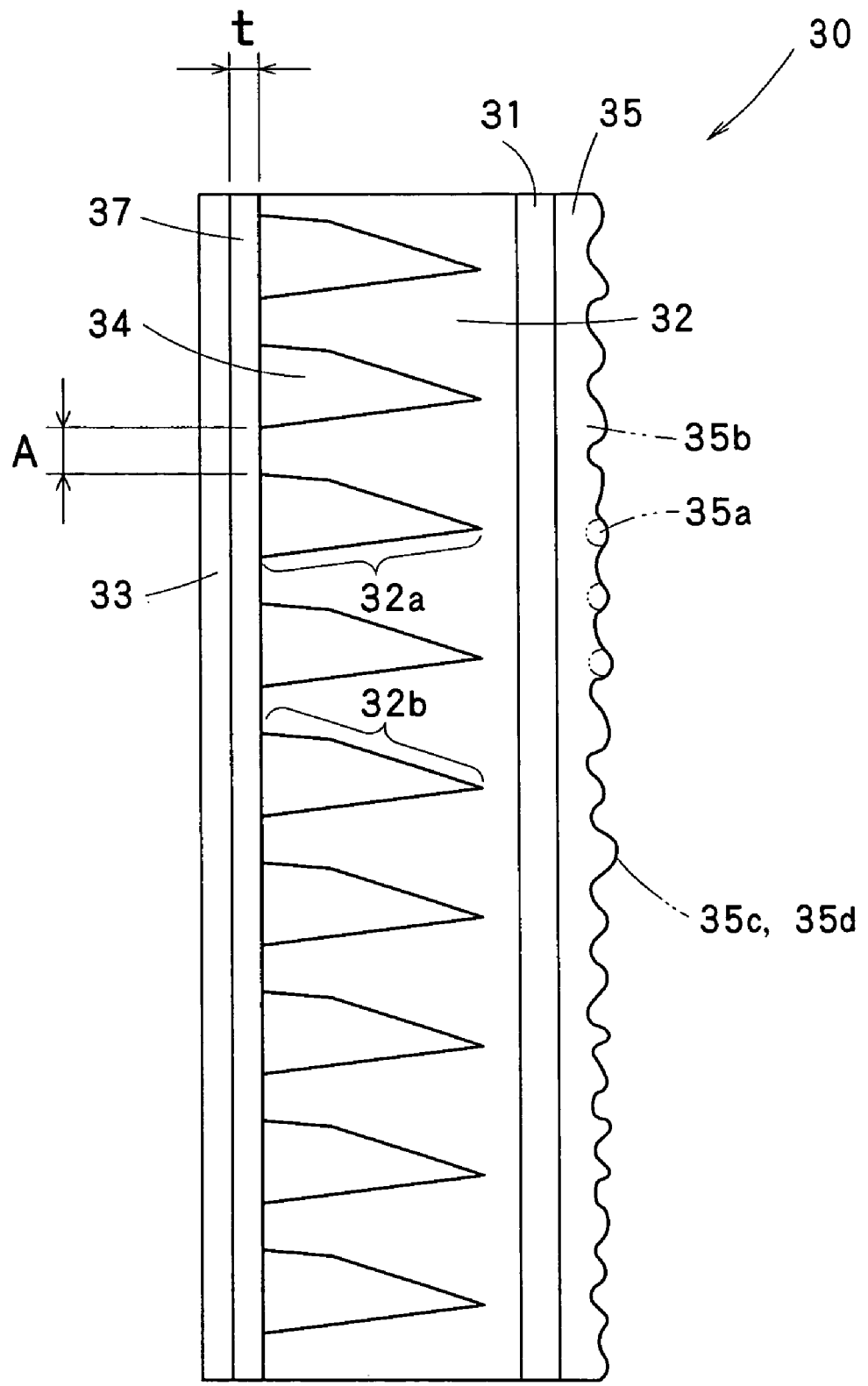
FIG. 9 is a cross section showing the reflecting screen of the Example 1-3 of the first embodiment of the present invention.

FIG. 9 is a cross section showing the reflecting screen 30 of the Example 1-3.

The reflecting screen 30 includes a base portion 31, unit prism shapes 32, light absorbing portions 34, an anti-regular-reflection layer 35, and an adhesive layer 37.

As the base portion 31, unit prism shapes 32, and light absorbing portions 34 are similar to the base portion 21, unit prism shapes 22, and light absorbing portions 24 in the Example 1-2, respectively, description of their details is omitted here.

A reflecting layer 33 is an aluminum plate having a high reflectance (Rt=70.6%, Rd=60.8%), and adhered and fixed on the rear face side of the unit prism shapes 32 and light absorbing portions 34 using a UV curing type adhesive. In order to form such a construction, the light absorbing portions 34 are formed in advance between the unit prism shapes 32, followed by adhesion of the reflecting layer 32 via the highly transparent adhesive layer 37. Alternatively, a cohesive layer may be used in place of the adhesive layer 37.

The reflecting layer 33 preferably has a reflectance of 40% or larger, more preferably has a diffuse reflectance Rd in the range of 10% to 70%. If the diffuse reflectance Rd is too low, mirror reflection occurs, thereby causing a very narrow visual field and making the screen impractical. If the diffuse reflectance Rd is too high, the visual field becomes wide, but the proportion that light diffusively reflected is absorbed by the light absorbing portions will be increased, thus lowering the effect of reflection. With such experiences, we found that if in the range of from 10% to 70%, the balance of the visual field and the diffuse reflection will be acceptable. The conditions of the reflectance and the diffuse reflectance Rd of the reflecting layer were proved to be preferable also in the aforementioned Examples 1 and 2.

A gap between the aluminum plate of the reflecting layer 33 and the unit prism shapes 32 and light absorbing portions 34, i.e., the thickness t of the adhesive layer 37 is preferably a half (½) or less of the width (width A in FIG. 9) on the side of the reflecting layer 33 (on the rear face side) of each unit prism shape 32. If the gap is further increased, the majority of reflected light, which is desired to be returned into the unit prism shapes 32 after reflected by the reflecting layer 33, will be incident on the light absorbing portions 34, thus significantly degrading the effect of reflection of the screen.

The anti-regular-reflection layer 35 is a layer including a large number of micro-concavo-convex portions formed at random on the surface thereof. As the layer 35 of this example is used a commercially available diffusion film (produced by KIMOTO Co., Ltd., trade name: TL-4) having a total transmittance efficiency of approximately 90%, a diffuse transmittance of approximately 37%, and a haze value of approximately 42%. For the convenience of preparing the drawing, while FIG. 8 appears to illustrate a state where a large number of wave-like portions are arranged obliquely on the surface of the anti-regular-reflection layer 35, the surface shape of this anti-regular-reflection layer 35 in this example should not necessarily be formed with such directivity, but may be formed, like a matted surface, by arranging irregular concavo-convex portions in large numbers at random on the surface.

The anti-regular-reflection layer 35 has the following functions of:

(1) preventing the projector optical engine portion from being reflected and observed with strong shining on the most front surface of the reflecting screen; and (2) increasing the angle observable of an image to be projected onto the reflecting screen.

The function (1) cannot be achieved if using a diffusion layer (diffusion film) of a type that a diffusion material is incorporated in the layer. In order to achieve this function, the surface must have micro-concavo-convex shapes. Depending on the degree of light diffusion due to the micro-concavo-convex shapes, the degree of preventing the shining of the image source can be adjusted. If the degree of light diffusion is too low, the prevention of the shining will be insufficient, while if too large, the screen will be observed to be whitish. With evaluation on a large number of diffusion films having different degrees of diffusion, we found that the shining can be prevented effectively without experiencing whitish appearance if setting the haze value of the anti-regular-reflection layer 35 to a range of 25% to 90%.

However, even though the haze value is in the aforementioned range, depending on the shape of the surface, some cases could not achieve the function (1).

Figure 10:
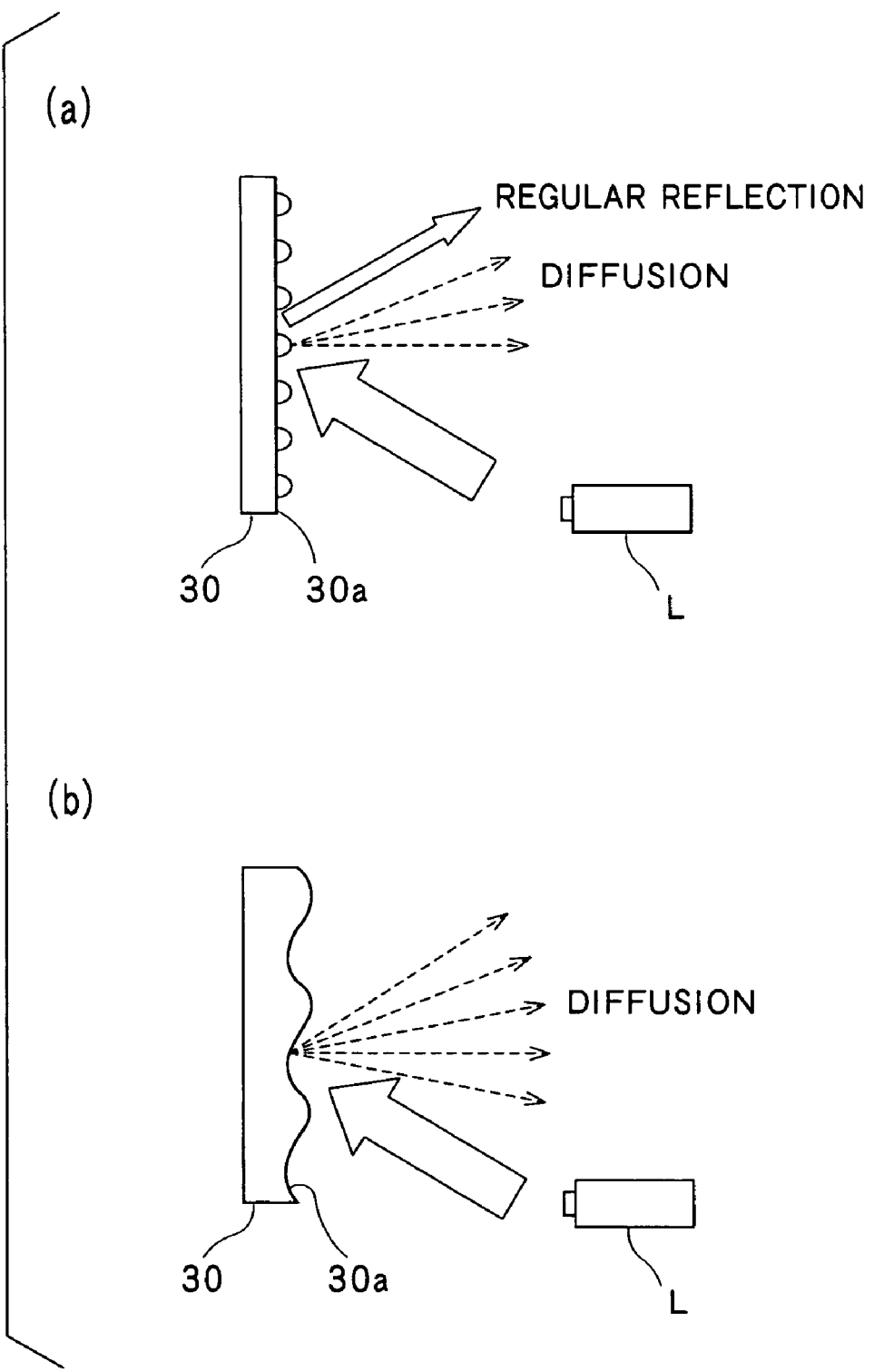
FIG. 10 is a diagram illustrating a difference in the effect of preventing strong shining caused by an image source, due to a difference between surface shapes of anti-regular-reflection layers of the first embodiment.

FIG. 10 is a diagram illustrating a difference in the effect of preventing strong shining caused by an image source, due to a difference between surface shapes of anti-regular-reflection layers.

As shown in FIG. 10(a), in the case where flat face portions which is parallel to a screen face 30a exist in a large proportion on the reflecting screen 30, the amount of light components of regular reflection generated on the flat faces is relatively large, leading to occurrence of the shining due to the image source. On the other hand, even though the same haze value is exhibited by the screens of FIG. 10(a) and FIG. 10(b), for prevention of the shining caused by the image source as the function (1), it is preferred to use such a reflecting screen, as shown in FIG. 10(b), that substantially no flat faces parallel to the screen face 30a are formed on the reflecting screen 30, and the whole surface of the screen is covered with concavo-convex shapes. Even with flat faces not parallel to the screen face, a large number of such flat faces oriented in the same direction may occur shining due to the image source when observed in a specific direction. It is thus preferred to lessen the proportion of flat faces as small as possible.

In this example, since the reflecting layer is formed by adhesion of an aluminum plate, the reflecting layer can be formed with ease and constantly. Additionally, the provision of such anti-regular-reflection layer enables to widen the visual field and completely prevent the shining caused by the image source.

Example 1-4

Figure 11:
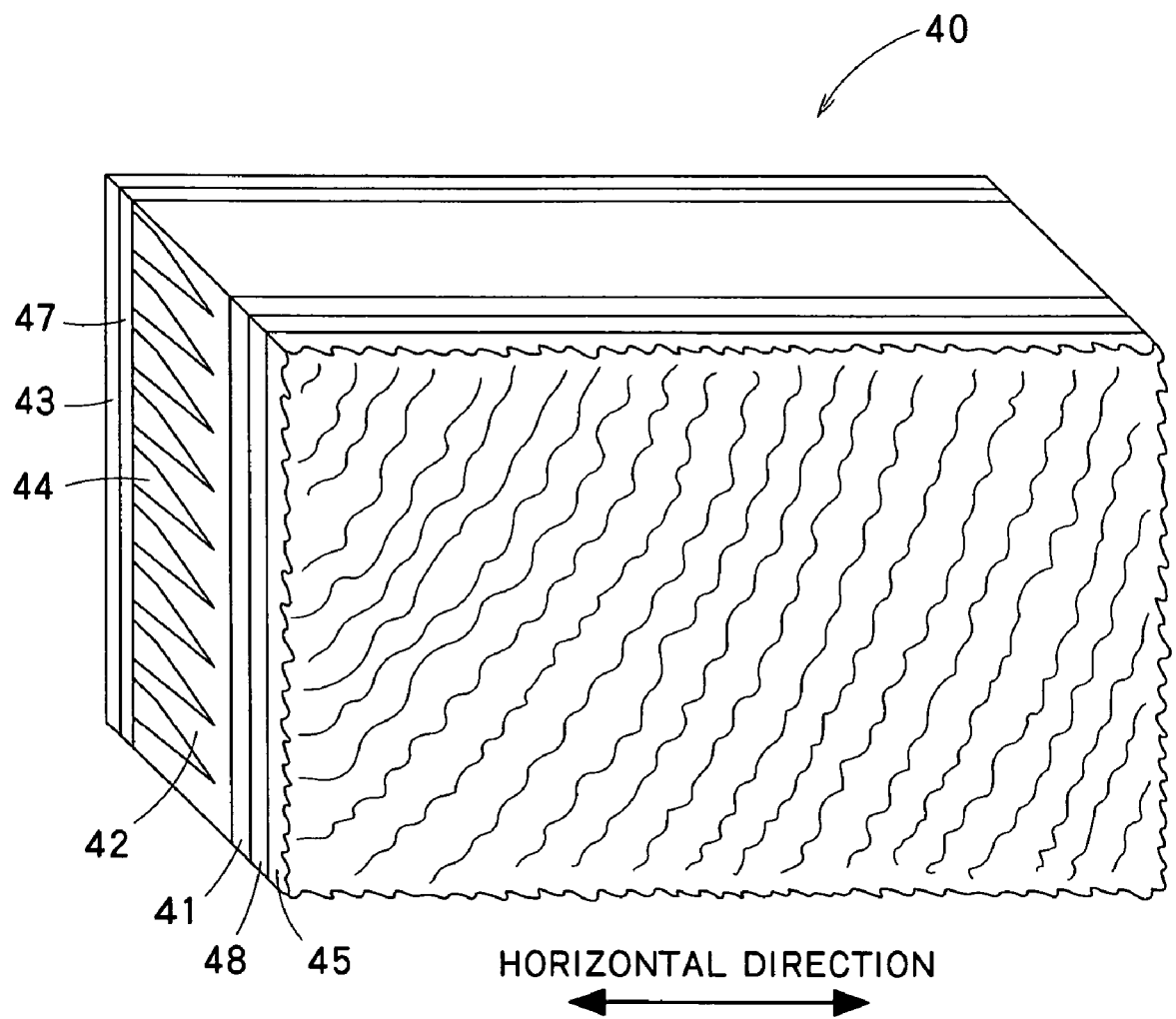
FIG. 11 is a perspective view showing a reflecting screen of an Example 1-4 of the first embodiment of the present invention, which is seen from above on the side of the image source.

FIG. 11 is a perspective view showing a reflecting screen 40 of an Example 1-4, which is seen from above on the side of the image source.

Figure 12:
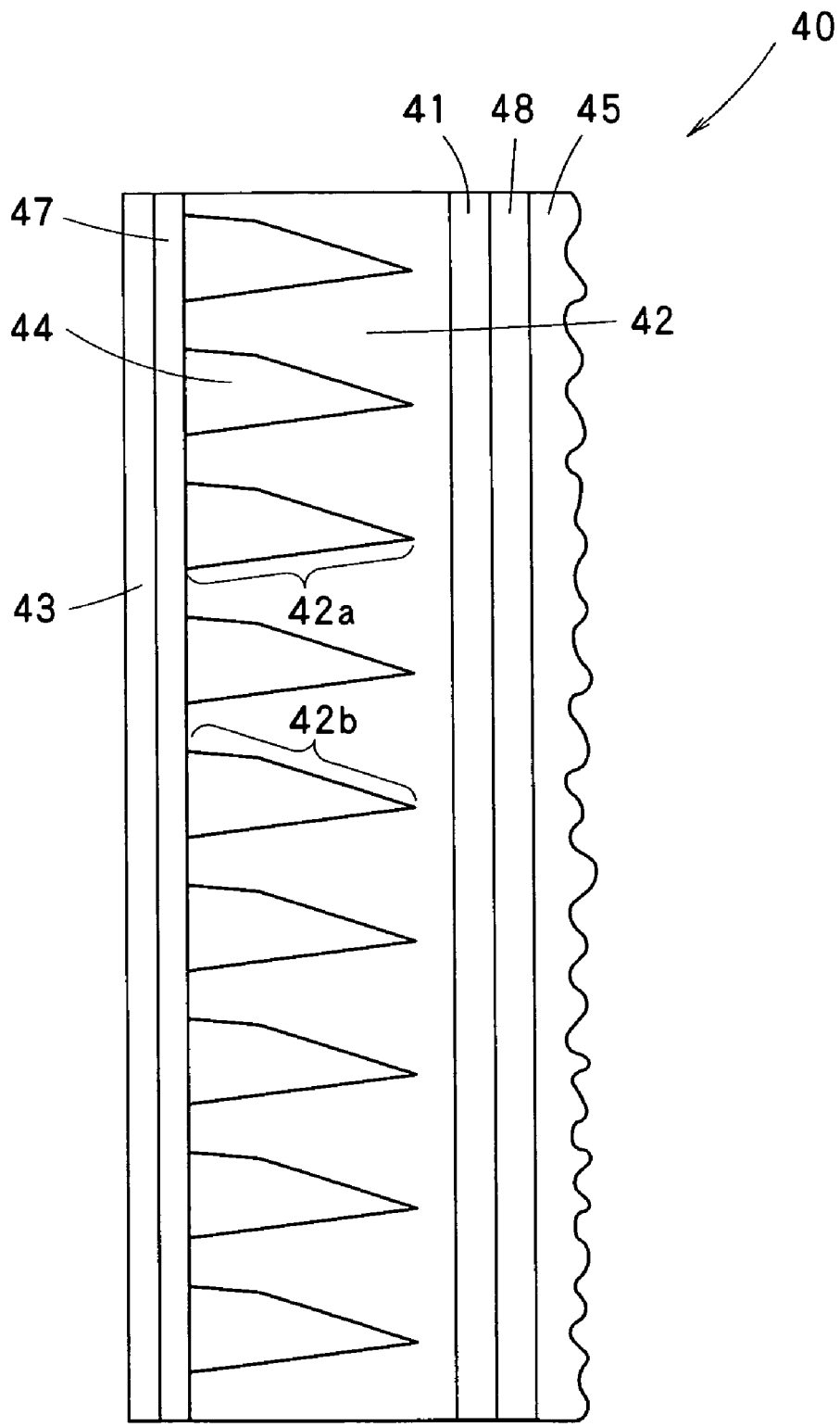
FIG. 12 is a cross section showing the reflecting screen of the Example 1-4 of the first embodiment of the present invention.

FIG. 12 is a cross section showing the reflecting screen 40 of the Example 1-4.

The reflecting screen 40 includes a base portion 41, unit prism shapes 42, a reflecting layer 43, light absorbing portions 44, an anti-regular-reflection layer 45, an adhesive layer 47, and a deforming diffusion layer 48.

As the base portion 41, unit prism shapes 42, reflecting layer 43, light absorbing portions 44, anti-regular-reflection layer 45, and adhesive layer 47 are similar to the base portion 31, unit prism shapes 32, reflecting layer 33, light absorbing portions 34, anti-regular-reflection layer 35, and adhesive layer 37 in the Example 1-3, respectively, description of their details is omitted here.

The deforming diffusion layer 48, which is placed between the base portion 41 and the anti-reflection layer 45 using an adhesive (not shown), is a holographic diffuser in which a generally 5 μm-stripe interference pattern is recorded as concavo-convex shapes, and is adapted to diffuse light transmitted through the layer 48 strongly only in a specific direction. The deforming diffusion layer 48 is arranged such that a haze value in the horizontal direction is about 70% and a haze value in the vertical direction is about 35%.

According to this example, the provision of the deforming diffusion layer 48 can control diffusion of light moderately also in the horizontal direction, in addition to the control in the vertical direction due to the unit prism shapes 42, thus widening the visual field.

Example 1-5

Figure 13:
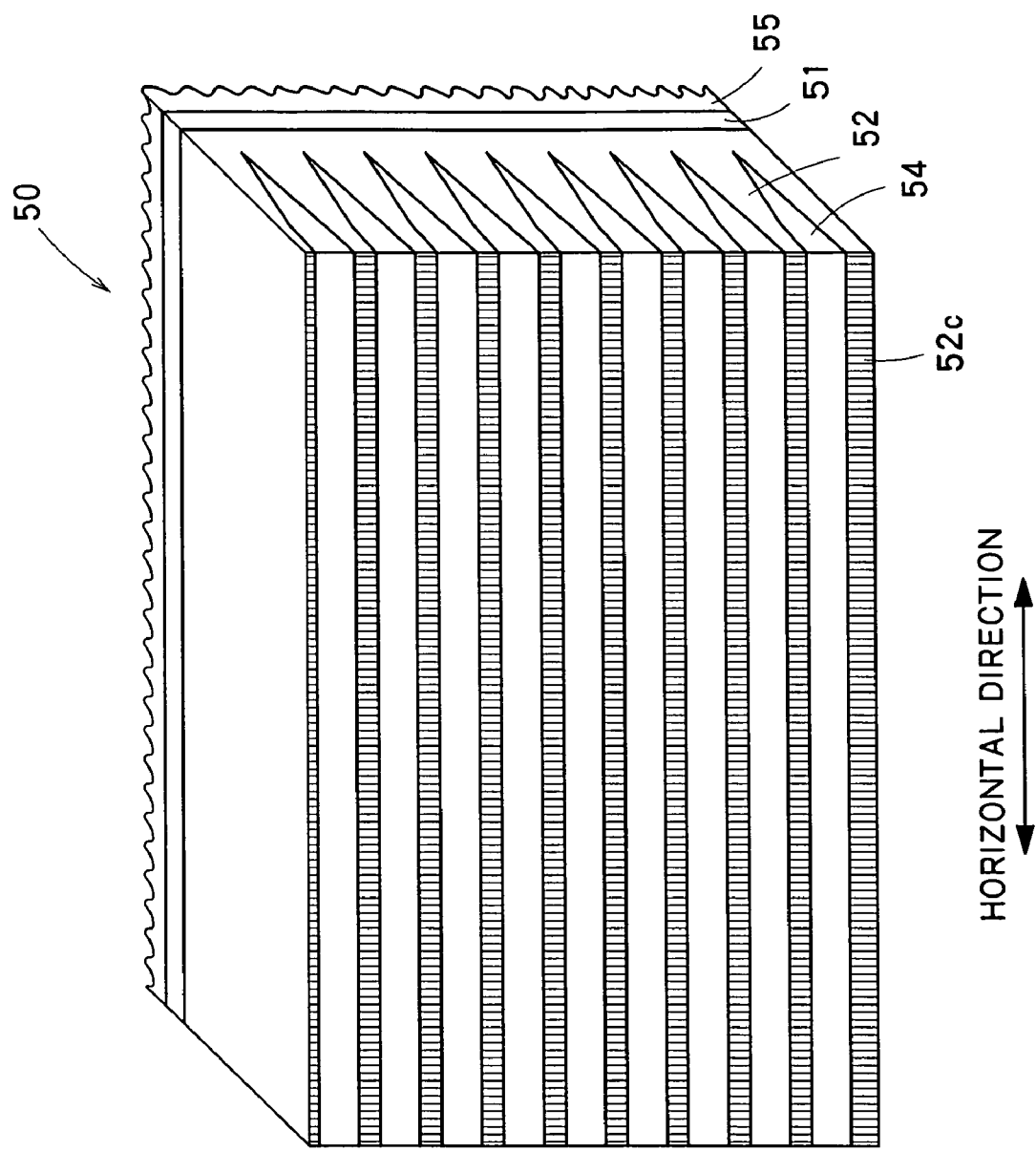
FIG. 13 is a perspective view showing a state prior to forming a reflecting layer on a reflecting screen of an Example 1-5 of the first embodiment of the present invention, which is seen from above on the side of the rear face.

FIG. 13 is a perspective view showing a state prior to forming a reflecting layer 53 on a reflecting screen 50 of an Example 1-5, which is seen from above on the side of the rear face.

Figure 14:
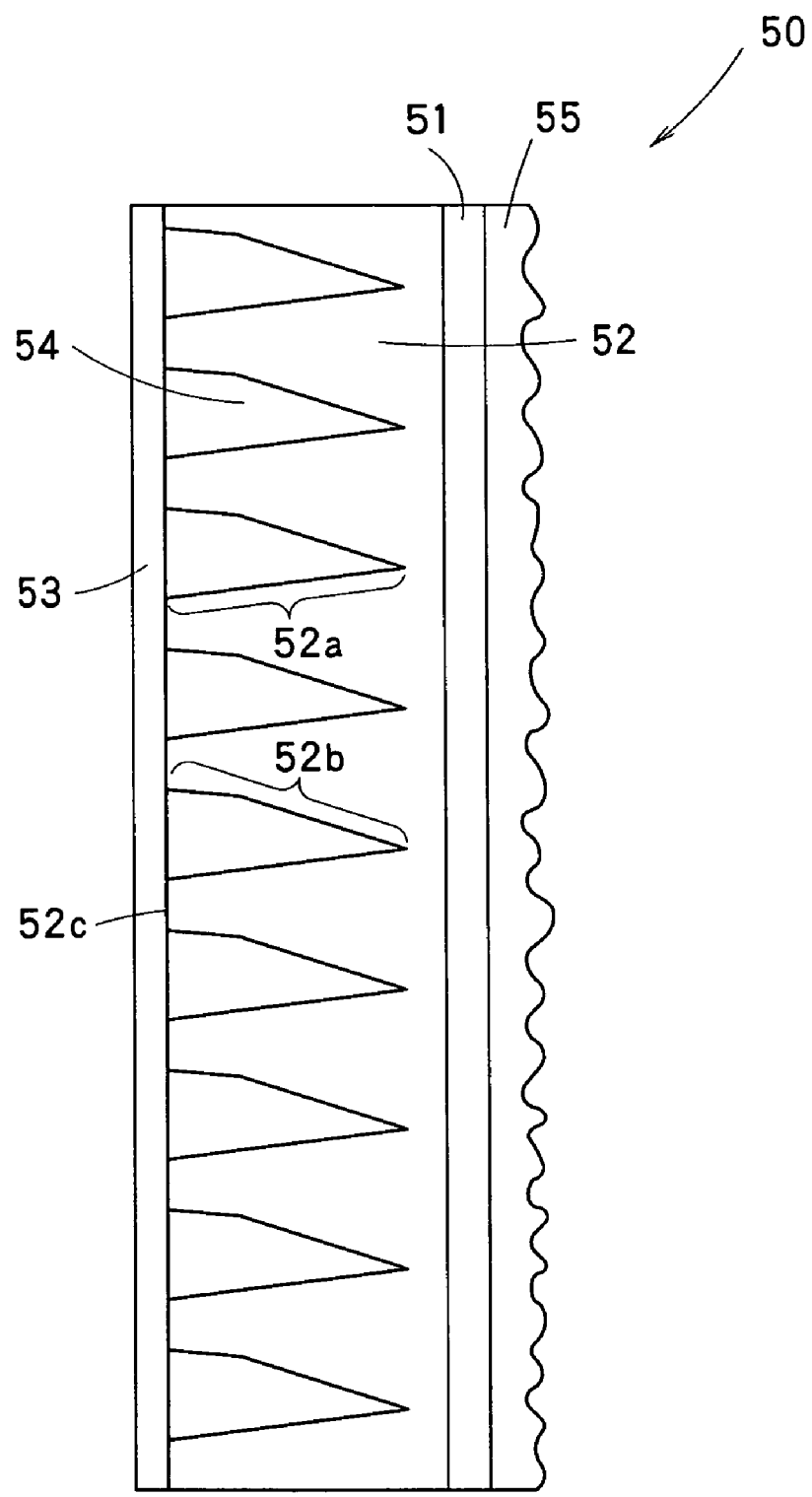
FIG. 14 is a cross section showing the reflecting screen of the Example 1-5 of the first embodiment of the present invention.

FIG. 14 is a cross section showing the reflecting screen 50 of the Example 1-5.

The reflecting screen 50 includes a base portion 51, unit prism shapes 52, a reflecting layer 53, light absorbing portions 54, and an anti-regular-reflection layer 55.

As the base portion 51, unit prism shapes 52, light absorbing portions 54, anti-regular-reflection layer 55 are similar to the base portion 31, unit prism shapes 32, light absorbing portions 34, anti-regular-reflection layer 35, respectively, description of their details is omitted here.

As shown in FIG. 13, in a state prior to forming the reflecting layer 53, top faces 52c on the rear face side of the unit prism shapes 52 are processed (hair line processing) such that fine stripes are formed intentionally in a direction (vertical direction) orthogonal to the direction (horizontal direction) along which longitudinal sides of the unit prism shapes 52 and the light absorbing portions 54 extend. In this embodiment, fine stripes are formed in the vertical direction by rubbing the top faces 52c using a #400 sand paper. Thereafter, the reflecting layer 53 is formed by spraying a highly reflective coating having a reflectance of about 68% and a diffuse reflectance of about 52% on the top faces where the fine stripes were formed.

Such formation of the reflecting layer 53 on the top faces 52c where the fine stripes were formed can create more distinctly fine stripes in the reflecting face. By applying such a surface diffusion treatment to the surface of the reflecting layer 53, strength of diffusion effect in the horizontal direction becomes quite larger than in the vertical direction.

In this example, it becomes possible to provide a reflecting screen which can widen the visual field in the horizontal direction and be observed well from any place.

Example 1-6

Figure 15:
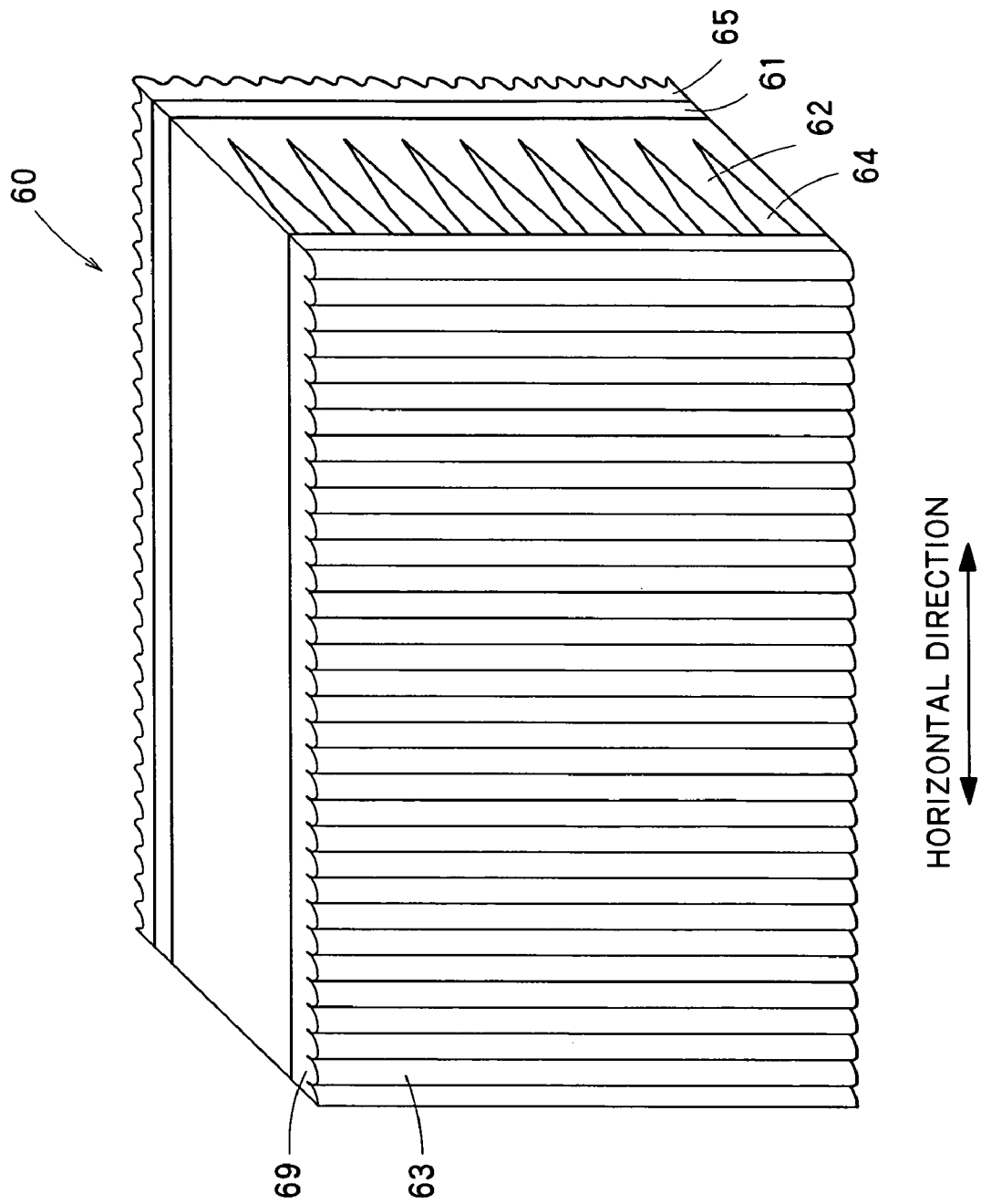
FIG. 15 is a perspective view showing a reflecting screen of an Example 1-6 of the first embodiment of the present invention, which is seen from above on the side of the image source.

FIG. 15 is a perspective view showing a reflecting screen 60 of an Example 1-6, which is seen from above on the side of the image source.

Figure 16:
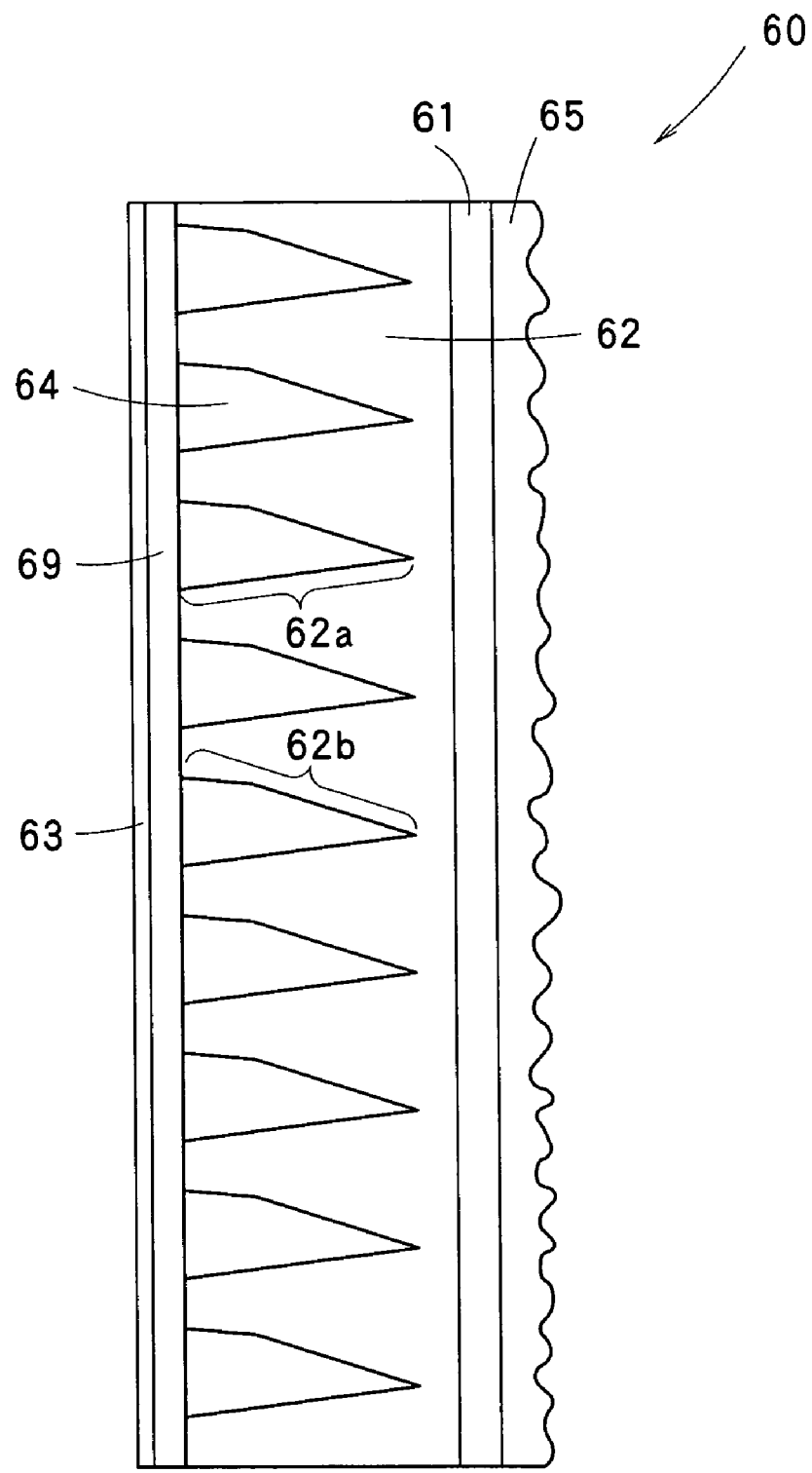
FIG. 16 is a cross section showing the reflecting screen of the Example 1-6 of the first embodiment of the present invention.

FIG. 16 is a cross section showing the reflecting screen 60 of the Example 1-6.

The reflecting screen 60 includes-a base portion 61, unit prism shapes 62, a reflecting layer 63, light absorbing portions 64, an anti-regular-reflection layer 65, and a lenticular lens layer 69.

As the base portion 61, unit prism shapes 62, reflecting layer 63, light absorbing portions 64, anti-regular-reflection layer 65 are similar to the base portion 51, unit prism shapes 52, reflecting layer 53, light absorbing portions 54, anti-regular-reflection layer 55, respectively, description of their details is omitted here.

The lenticular lens layer 69 is a lenticular lens shape which is provided in place of the vertical fine stripes formed on the top faces 52c in the Example 1-5. The lens shape of the lenticular lens layer 69 includes a portion of an elliptic cylindrical shape as a unit shape and is formed by arranging the unit elliptic cylindrical shapes in large numbers in the horizontal direction. Accordingly, this layer 69 extends in the vertical direction while keeping its horizontal cross sectional shape to be the same.

After formation of the lenticular lens layer 69, the reflecting layer 63 is formed in the same manner as in Example 1-5.

In this example, the provision of the lenticular lens shape enables to provide more precise control of the diffusion effect in the horizontal direction.

Example 1-7

Figure 17:
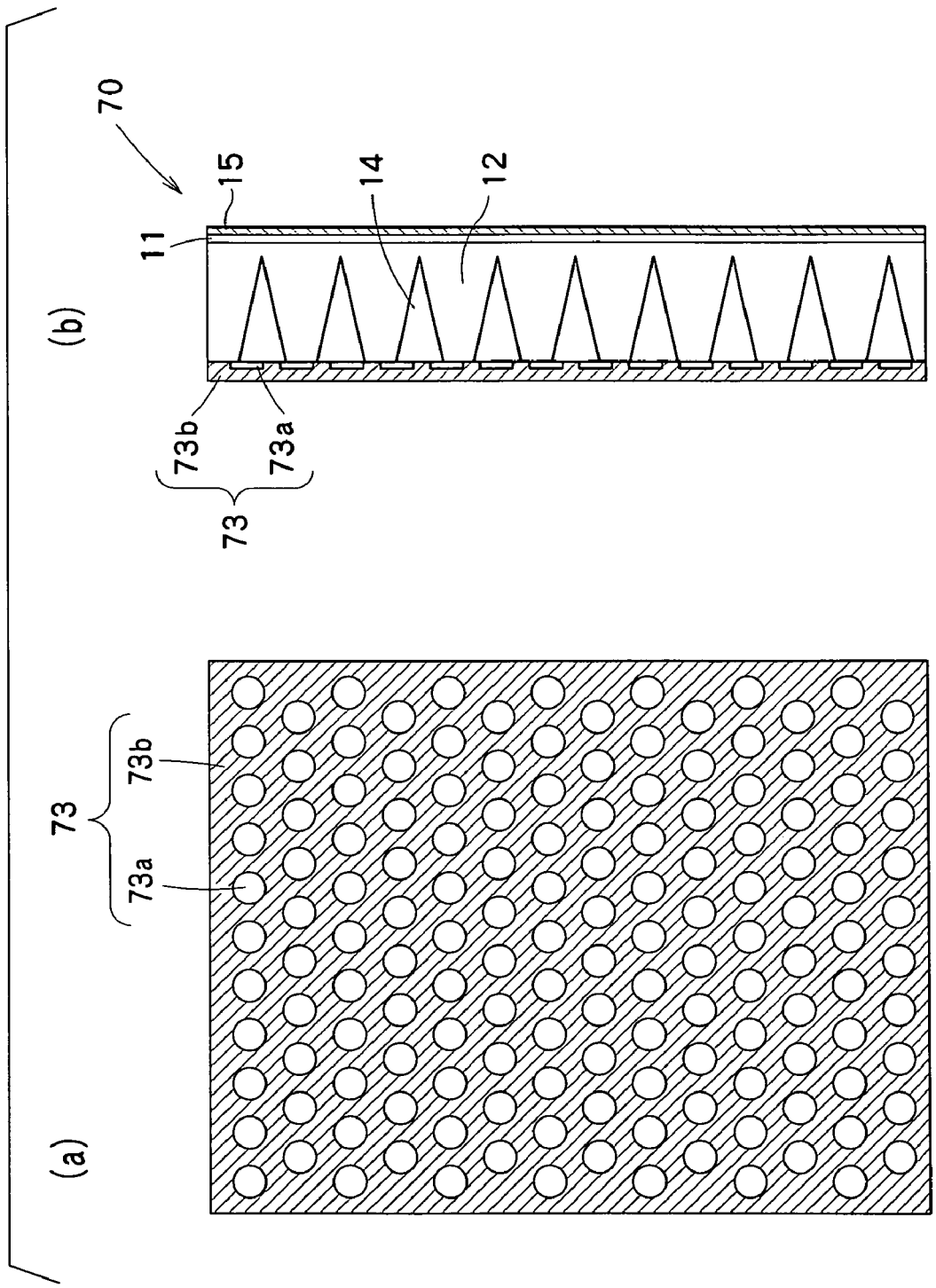
FIG. 17 is a diagram showing a reflecting screen of an Example 1-7 of the first embodiment of the present invention.

FIG. 17 is a diagram showing a reflecting screen 70 of an Example 1-7. FIG. 17(a) is a diagram viewed from the rear face side, and FIG. 17(b) is a cross section.

The reflecting screen 70 in the Example 1-7 is similar to that in the Example 1-1 except that it uses a reflecting layer 73 as a modification of the reflecting layer 13 of the Example 1-1. Accordingly, parts performing the same functions as those of Example 1-1 are denoted by the same numerals, and repeated descriptions will be omitted appropriately.

The reflecting layer 73 is formed by combining a regular reflection layer 73a and a diffuse reflection layer 73b.

The regular reflection layer 73a is a layer having a diffuse reflectance Rd (73a) lower than a diffuse reflectance Rd (73b) of the diffuse reflection layer 73b, and is formed by making the light absorbing portions 14 prior to forming the reflecting layer, followed by printing partly employing a screen printing (for example, to form a dot-like or mesh-like pattern as shown in FIG. 17).

The diffuse reflection layer 73b, as mentioned above, is a layer having the diffuse reflectance Rd (73b) which is higher than the diffuse reflectance Rd (73a) of the regular reflection layer 73a, and is formed by printing over the whole surface after the formation of the regular reflection layer 73a.

In this way, since the reflecting layer is formed by combining a plurality of regions having different values of diffuse reflectance Rd, alteration of the proportion of ratios of the area occupied by the respective regions can provide a proper setting of the proportion of reflected light with strong regular reflection and reflected light with strong diffuse reflection. Consequently, the peak brightness of the front face and the proportion of distribution of observing angles can be controlled as desired.

(Modifications)

Without limited to the examples as described above, various alterations and modifications are possible, and these are also within the equivalence of the present invention.

(1) While as the unit prism shape in each of the Examples, one aspect of the shape formed by combining flat planes was described, the unit prism shape is not limited to such a configuration, but may also includes shapes formed by combining curved surfaces partly or entirely. Alternatively, other than using such prism shapes, a simple light transmitting potion having an equal width from its rear face side to its image source side may be used.

(2) While in each of the Examples, one aspect which performs the step of forming the light absorbing portions after the step of forming the reflecting layer(s) was described, the procedure is not limited to this aspect. For example, the step of forming the reflecting layer(s) may be performed after the step of forming the light absorbing portions. In such a procedure of the steps, the reflecting layer can be formed on the whole surface of the rear face after filling the material of each light absorbing portion between each adjacent pair of the unit prism shapes using wiping or the like means, thereby providing a method especially effective in the case where the formation of the light absorbing portions is carried out with ease.

(3) While in each of the Examples, one aspect was described, in which the unit prism shapes and light absorbing portions extend horizontally while keeping the same cross-sectional shapes and are arranged in the vertical direction in large numbers, respectively, the arrangement is not limited to this aspect. For example, if the direction of natural light and image light is horizontal, the arrangement of the unit prism shapes and light absorbing portions may be rotated by 90 degrees correspondingly to the direction of light. Otherwise, an assembly of unit prism shapes 22, 22A and light absorbing portions 24, 24A may be provided in two layers such that they are arranged orthogonally to one another (see FIG. 4).

In this case, the unit prism shapes 22 are arranged linearly in one direction in large numbers with the light absorbing portions 24 being provided between each adjacent pair of unit prism shapes 22. Further, a large number of additional unit prism shapes 22A are arranged linearly in the other direction orthogonal to the one direction with the additional light absorbing portions 24A being provided between each adjacent pair of additional unit prism shapes 22A.

Alternatively, an assembly of a large number of the additional unit prism shapes 22A and a large number of the additional light absorbing portions 24A may be laminated on an assembly of a large number of the unit prism shapes 22 and a large number of the light absorbing portions 24.

(4) While in each of the Examples, one aspect in which the light absorbing portions are formed by filling the black color beads therein was described, the formation is not limited to this aspect. For example, a resin kneaded with the black color beads may be used for the formation of the light absorbing portions. In this case, it is preferred to form the light absorbing portions by kneading the black color beads in a resin having a refractive index lower than a refractive index of a material to be used for forming the unit prism shapes.

(5) While in each of the Examples, one aspect of a fixed type reflecting screen was mentioned, the type is not limited to this aspect. For example, a hoist type reflecting screen may be used, which can be hoisted and housed when not used.

(6) In the Examples 1-3 to 1-6, while one example of a commercially available diffusion film is described as the anti-regular-reflection layer 35, this layer 35 is not limited to such types of diffusion films. For example, the anti-regular-reflection layer may be formed by kneading a large number of micro-beads 35a with a binder for fixing these beads thereto such that the micro-beads 35a shift project to on the side of the image source from the binder portion so as to form fine concavo-convex shapes (FIG. 9).

(7) In the Examples 1-3 to 1-6, while one aspect of using irregular matted fine concavo-convex shapes as the anti-regular-reflection layer 35, the layer 35 is not limited to this aspect. For example, regular reflection light components can be reduced by providing a lens array composed of micro-unit lens shapes arranged in a one-dimensional or two-dimensional orientation.

In this case, with a lenticular lens array 35c formed by arranging the unit lens shapes in a one-dimensional orientation, the visual field may also be controlled by arranging the direction along which the unit lens shapes extend having the same cross-sectional shape orthogonally to the direction along which the light transmitting portions and the light absorbing portions extend having the same cross-sectional shapes respectively.

In addition, in the above case, if using a micro-lens array formed by arranging the unit lens shapes 35d in a two-dimensional orientation, the visual field may also be controlled by arranging the longitudinal direction of the unit lens shapes when the unit lens shapes are observed along the normal direction to the screen orthogonally to the direction along which the light transmitting portions and the light absorbing portions extend having the same cross-sectional shapes respectively.

(8) In the Examples 1-3 to 1-6, at least one of an antistatic finish, hard-coating, and antifouling may be applied to and along the surface on the image source side of the anti-regular-reflection layer. As a result, the antistatic, hard-coating or antifouling function can be added to the anti-regular-reflection layer while maintaining the primary function of this layer to reduce regular reflection light components.

(9) In the Example 1-3 or 1-4, a light diffusing material may be incorporated in the adhesive layer 37 or 47.

(10) In the Example 1-4, one aspect where the deforming diffusion layer 48 is formed in the proximity of the anti-regular-reflection layer 45 was illustrated, the position is not limited to this aspect. For example, if the shining is less on the surface of the deforming diffusion layer 48, this layer 48 may be positioned on the image source side or in the vicinity of the reflecting layer.

Second Embodiment

A second embodiment of the present invention will now be described with reference to FIGS. 18 to 20.

The object to obtain images having a high contrast and high brightness but free of strong shining was achieved by utilizing linearly polarized light as the image light coming from the image source.

Figure 18:
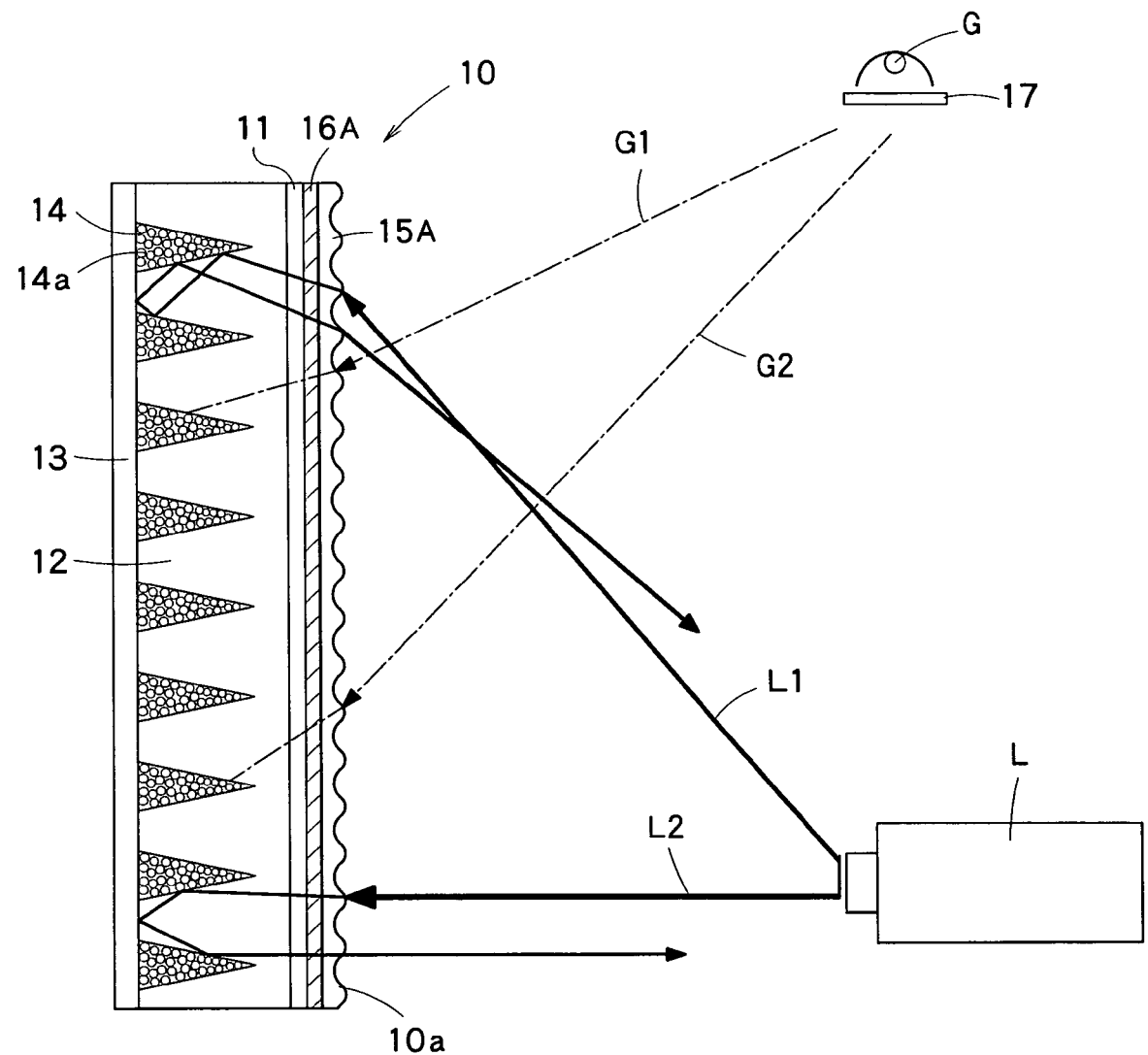
FIG. 18 is a cross section of a reflection-type projection system of a second embodiment of the present invention.

FIG. 18 is a cross section showing a reflection-type projection system of this example.

Figure 19:
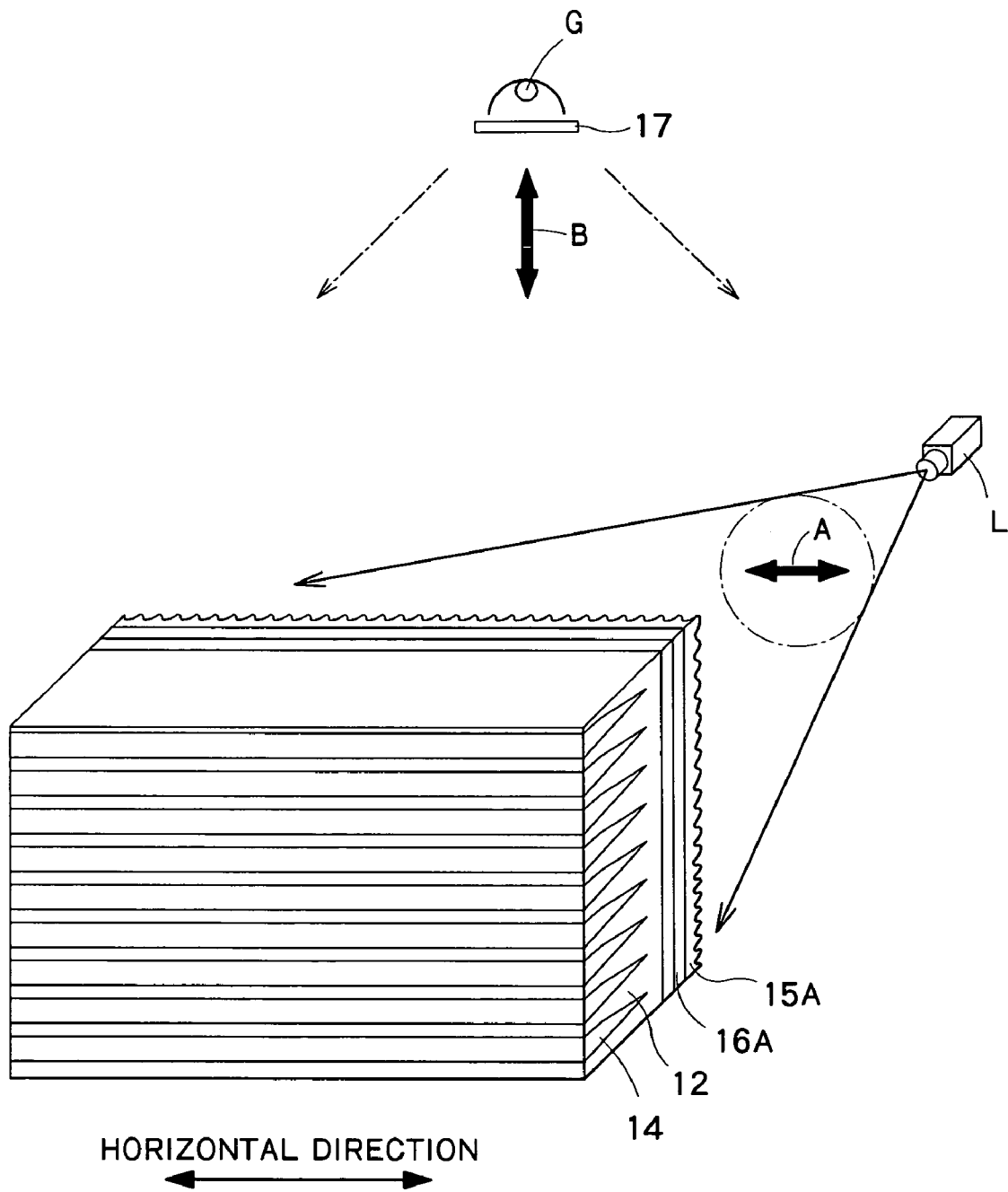
FIG. 19 is a perspective view showing the reflection-type projection system of the second embodiment of the present invention.

FIG. 19 is a perspective view showing the reflection-type projection system of this example. In FIG. 19, the reflecting layer 13 is not shown for the convenience of explanation. Also for the purpose of explanation, in FIGS. 18 and 19, sizes, shapes or the like factors are advantageously emphasized, and an interior lighting G, an image source L, and a reflecting screen 10 are depicted schematically and collectively, and thus the respective positional relations are different from actual ones, and other expressions, including incident angles of light, which differ from actual sizes or dimensions will be included in the description below.

The reflecting screen 10 of this example is a screen which has been developed such that a projector optical engine portion (image source) L for projecting image light is installed lower than the center of the screen 10 to take a position from which the image light will be projected obliquely and upwardly, and most of ambient light will be incident on the screen from above. In such a construction, the image light coming from below is reflected toward an observer with high efficiency, and unnecessary light coming from above is absorbed by light absorbing portions described below, and hence to provide a reflecting screen for use in an extremely high contrast front projector.

The projector optical engine portion (image source) L is a liquid crystal type projector. In this case, the polarization of image light to be projected from this projector produces linearly polarized light, and the projector is arranged such that the polarization direction A depicted by an arrow in FIG. 19 will be horizontal.

FIG. 18 shows a vertical cross section of the screen in use.

As shown in FIG. 18, the reflecting screen 10 reflects image light L1, L2 projected from the image source L, has a screen face 10a, and includes a base portion 11, light transmitting portions 12 provided on the base portion 11 and adapted to transmit light, and light absorbing portions 14 adapted to absorb light. Each of the light transmitting portions 12 comprises a unit prism shaped portion (or simply referred to as a unit prism shape) 12 which in a cross section orthogonal to the screen face 10a is a generally wedge like shape having a larger width on the side of the image source L than its width on the rear face side and arranged in large numbers along the screen face 10a.

Each unit prism shaped portion 12 extends linearly along the screen face 10a, and each light absorbing portion 14 disposed between each adjacent pair of the unit prism shaped portions 12 and having a triangularly shaped cross section also extends along the screen face 10a. Thus, in FIG. 18, the unit prism shaped portions 12 and the light absorbing portions 14 are arranged alternately.

A reflecting layer 13 is provided on the rear face side of each unit prism shaped portion 12. On the side of the image source L of the base portion 11 are provided polarizing layer 16A and an anti-regular-reflection layer 15A successively.

The base portion 11 serves as a base material to be required when the unit prism shaped portions 12 are formed, and constitutes a light transmitting portion formed of acrylic, polycarbonate, or polyethylene terephthalate resins. In this example, an acrylic resin is used for the base portion 11. Optionally, the base portion 11 may be tinted with a dye of a gray color for example, or a pigment to reduce its transmittance to a predetermined value.

In the cross section of FIG. 18, each unit prism shape 12 has a generally wedge-like shape having a larger width on the image source side than its width on the rear face side. The unit prism shapes 12 are arranged in large numbers along the screen face (from the top to the bottom in FIG. 18). Each of the unit prism shapes 12 is symmetrical in the vertical direction about its center line, each upper slope or lower slope of the unit prism shape 12 defines an angle of 5° relative to the normal line to the screen face. Each apex portion has a width of 40 µm, and the height from the bottom face to the apex portion is 200 µm. The unit prism shapes 12 are formed of an ultraviolet (UV) curing resin having a refractive index of 1.56. The term "screen face" means a face that will constitute a plane of a screen when viewing it as the entire body of the screen, and is used as the same definition also in the description below and the claims.

Each of the light absorbing portions 14 serves as a portion adapted to absorb light to be produced between each pair of the unit prism shapes 12. Each light absorbing portion 14 of this example is formed by filling it fully with black color beads 14a. These black color beads 14a are micro-beads adapted to absorb light, and voids formed between these beads in the light absorbing portion 14 define a space. Such a construction enables the light absorbing portions 14 to deform with ease, and advantageously imparts flexibility to the reflecting screen 10, which flexibility will be necessary to make the same screen of a hoist type.

The unit prism shapes 12 and the light absorbing portions 14 extend in the horizontal direction while keeping their cross-sectional shapes as shown in FIG. 18. As stated above, since the polarization direction of image light is horizontal, this polarization direction is coincident with the direction along which the unit prism shapes 12 and the light absorbing portions 14 extend. The reason for this configuration will be described below.

The reflecting layer 13 is provided on the rear face side of the apex portions of the generally wedge-like shapes of the unit prism shapes 12, and serves as a layer for reflecting image light and returning it toward the front face (or the image source). The reflecting layer 13 is formed to cover the whole surface of the screen so as to hold black color beads 14a (not shown) filled in the light absorbing portions 14.

The reflecting layer 13 of this example is formed of a polarized-light reflecting material for selectively reflecting light which was polarized in a certain direction. The reflecting layer 13 of this example is configured by utilizing a wire-grid polarizer which is formed by arranging dielectrics and conductors alternately along the surface, such that the polarization direction in which the reflecting layer 13 will reflect light selectively becomes horizontal, thus being coincident with the polarization direction of image light. Accordingly, the reflecting layer 13 can reflect the image light with high efficiency but reflect little natural light having the polarization direction not coincident with that of the reflecting layer 13. Since the wire-grid polarizer is a reflecting layer with a polarization selectivity, no additional reflecting layer is required. Because the light not reflected is transmitted toward the rear face, for example, a black-colored light absorbing layer may be further provided to prevent reflection of such natural light on any one of the faces (for example, the wall) on the screen rear face side. Other than the wire-grid polarizer, for example, a DBEF (produced by SUMITOMO-3M Co., Ltd.) can be used as the reflecting layer 13.

The reflectance of the reflecting layer 13 of this example is 81.1% on average in the range of 400 to 700 nm for the polarized light coincident with its polarization direction but 3.4% for the light polarized vertically to the polarization direction.

The anti-regular-reflection layer 15A is a layer having a large number of micro-concavo-convex portions formed at random on the surface thereof. As the layer 15A of this example is used a commercially available diffusion film (produced by KIMOTO Co., Ltd., trade name: TL-4) having a total transmittance efficiency of approximately 90%, a diffuse transmittance of approximately 37%, and a haze value of approximately 42%. In the measurement of the aforementioned haze values and those described below, a Haze-Transmittance-Reflectance HR-100 type meter (Produced by MURAKAMI SIKISAI GIJUTU KENKYUSHO) was used.

The anti-regular-reflection layer 15A has the following functions of:

(1) preventing the image source L from being reflected and observed as shining on the most front surface of the reflecting screen; and (2) increasing the angle observable of an image to be projected onto the reflecting screen.

The function (1) cannot be achieved if using a diffusion layer (diffusion film) of a type that a diffusion material is incorporated in the layer. In order to achieve this function, the surface must have fine micro-concavo-convex shapes. Depending on the degree of light diffusion due to the fine micro-concavo-convex shapes, the degree of the effect of preventing the shining caused by the image source can be adjusted. If the degree of light diffusion is too small, the prevention of the shining will be insufficient, while if too large, the screen will be observed to be whitish. With evaluation on a large number of diffusion films having different degrees of diffusion, we found that the shining can be prevented effectively without experiencing whitish appearance if setting the haze value of the anti-regular-reflection layer 15A to a range of 25% to 90%.

While the front face of the anti-regular-reflection layer 15A may be subjected to various surface treatments, such as an antistatic treatment, hard-coating, antifouling or the like, the aforementioned micro-concavo-convex shapes should remain on the surface in such a case.

The polarizing layer 16A is provided between the base portion 11 and the anti-regular-reflection layer 15A and used for adjusting a state of polarization of light passing through the layer 16A to linearly polarized light in a predetermined polarization direction. Specifically, the polarizing layer 16A is an absorption-type polarizer which allows the polarized component coincident with the predetermined polarization direction to pass through it, but absorbs polarized components of the directions other than the predetermined polarization direction.

The predetermined polarization direction along which the polarized light is adjusted by the polarizing layer 16A of this example is set to be horizontal. That is, the polarization direction in which the polarized light can pass the polarizing layer 16A is substantially the same as the polarization direction of image light. In such a way, while the image light can pass through the polarizing layer 16A toward the reflecting layer 13, most of the light (for example, natural light) including polarized components of directions other than the predetermined polarization direction of the polarizing layer 16A is absorbed by the polarizing layer 16A.

In the reflecting screen 10 described above, as shown in FIG. 18, image light L1, L2 projected from the image source L is guided through the unit prism shapes 12, and then totally reflects on an interface between each unit prism shape 12 and each corresponding light absorbing portion 14. Since each light absorbing portion 14 contains black color beads filled therein and voids between the beads make a space, the refractive index of the light absorbing portions 14 is lower than that of the unit prism shapes 12. Accordingly, light which is incident on the interface at an angle larger than the critical angle totally reflected.

Thereafter, the image light which totally reflected on the interface between each unit prism shape 12 and each corresponding light absorbing portion 14 will reach the reflecting layer 13 and then be reflected by the layer 13, followed by further total reflection and so on, thereafter returned toward an observer as a visible light.

On the other hand, natural light G1 or G2 coming from an interior lighting G or the like provided above the reflecting screen 10 has a larger incident angle relative to the reflecting screen 10, thereby lessening the incident angle on the interface between each unit prism shape 12 and each corresponding light absorbing portion 14, thus containing a larger amount of components not exceeding the critical angle, then being transmitted through the light absorbing portion 14 without generating total reflection, and absorbed in the black color beads. Accordingly, the proportion of the natural light which will return to a point of observation can be significantly reduced.

The reason for making the polarization direction of the image light be coincident with the direction along which the unit prism shapes 12 and the light absorbing portions 14 extend while keeping their cross-sectional shapes to be the same will now be described.

In the case where polarized light is reflected, it is already known that the reflectance will vary with the relation between the state of polarization (polarization direction) and the reflecting surface, and the reflectance relative to the reflecting surface will be larger in the S-type polarization than in the P-type polarization.

In the reflecting screen 10 of this example, since total reflection is utilized at an interface of each unit prism shape 12 and each corresponding light absorbing portion 14, the more the proportion of S-type polarization becomes in the relation between the interface and the light arriving at the interface, the more efficient the reflection of image light will be.

Figure 20:
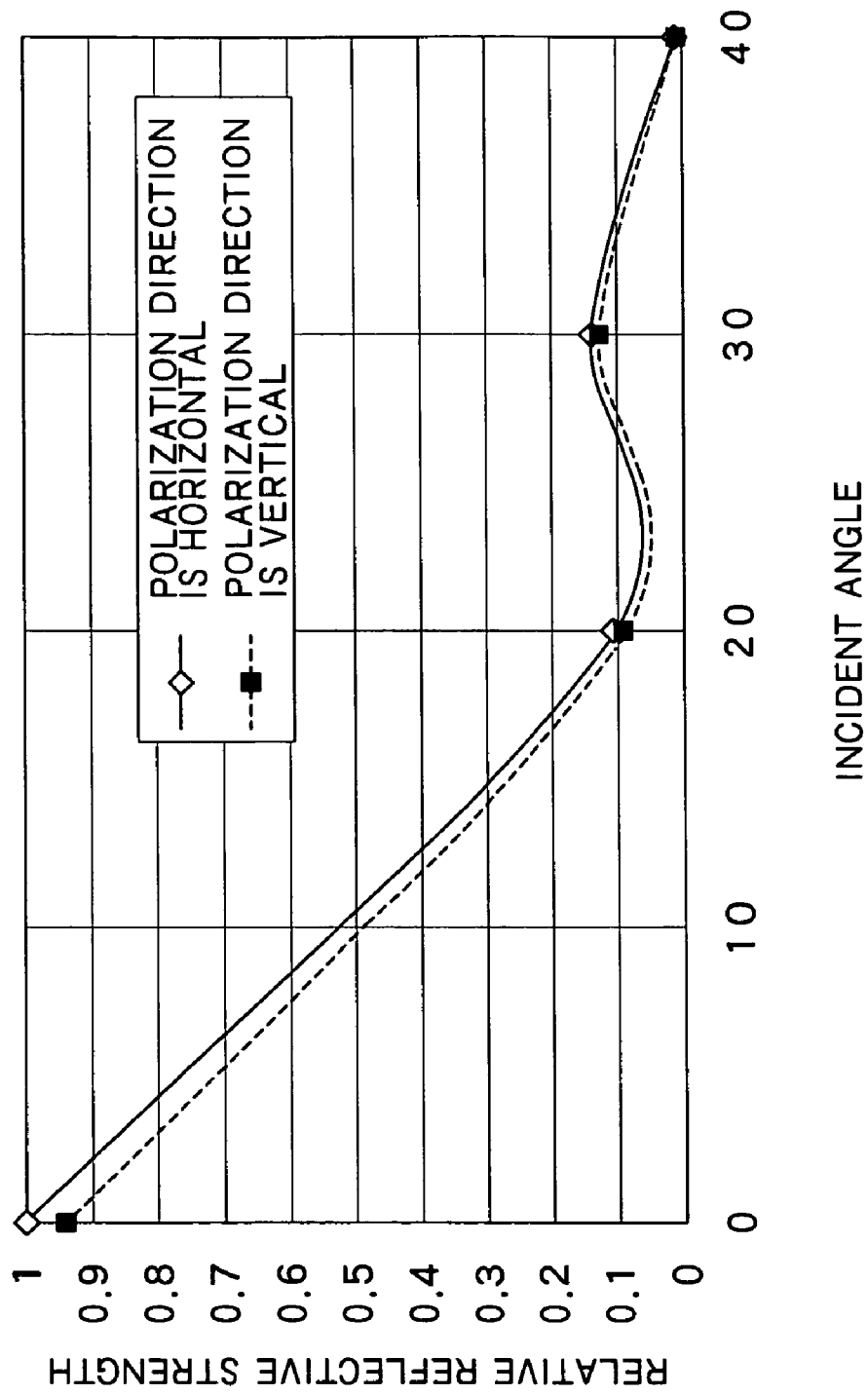
FIG. 20 is a graph showing changes of reflectance due to a difference in the polarization directions of the second embodiment of the present invention, which are plotted per certain incident angle relative to the reflecting face.

FIG. 20 is a graph in which changes of reflectance due to a difference in the polarization directions of this example are plotted per certain incident angle relative to the screen face of the reflecting screen 10.

In FIG. 20, the case where the polarization direction of the image light is vertical and the case where the polarization direction is horizontal are depicted based on the image light with the horizontal polarization direction and the incident angle of 0°. It is seen from FIG. 20 that the case where the polarization direction of the image light is horizontal is higher in the reflective strength than the case where the polarization direction is vertical. This is because in the case where the polarization direction of the image light is horizontal, the state of polarization of the image light arriving at the interface between each unit prism shape 12 and each corresponding light absorbing portion 14 will include more proportion of light of the S-type polarization in the relation to the interface.

Therefore, in this example, the polarization direction of image light is made to be coincident with the direction along which the unit prism shapes 12 and the light absorbing portions 14 extend while keeping the same cross-sectional shapes, respectively, thereby to make the relation between the incident angle at the total reflection surface (the interface) and the polarization direction of the image light such that the proportion of light of the S-type polarization will be increased, and thus reflecting the image light with higher reflectance.

If the reflecting screen 10 would be rotated to match with the polarization direction, the original relation between the image source L and the interior lighting G will be broken. Therefore, in order not to break this positional relation, in this example, the image source L from which image light is projected in a form of horizontally and linearly polarized light is used.

Also, in this example, the polarization direction of the image light is limited to the horizontal direction as described above, and the reflecting layer 13 and the polarizing layer 16A are arranged to match with the polarization direction. Accordingly, even if natural light not having such a polarizing property arrives at the reflecting screen 10, the light other than the one having components coincident with the polarization direction of the image light will not be reflected. Accordingly, images displayed on the reflecting screen 10 will be significantly high contrast ones.

Moreover, in this example, to make high contrast images observable even in a relatively bright room, a modification is provided to the interior lighting G for using it as a part of the reflection-type projection system.

The illumination light for illuminating the room is emitted from the interior lighting G in a form of linearly polarized light, wherein the polarization direction of the illumination light is set in the direction vertical to the polarization direction of the image light or in the vertical polarization direction to the image light (the direction B depicted by an arrow in FIG. 19). Specifically, a polarizing filter 17 is placed in a position where light is emitted from the interior lighting G such that the polarization direction of the illumination light in the room is set in the direction substantially vertical to the polarization direction of the image light. In this way, if there is no other light source, the light which will arrive at the screen 10 can be limited only to the horizontally and linearly polarized image light and the illumination light which is linearly polarized in the direction vertical to the polarization direction of the image light. Accordingly, the use of the reflecting screen 10 of this example enables to selectively reflect only the image light and present significantly high contrast and high quality images even in a considerably bright environment.

Actually, when image light was projected toward the reflecting screen 10, the screen 10 presented high reflectance for the projected image while absorbing most of the natural light.

Thus, according to the present invention, images with high contrast and high brightness but free of shining can be presented even in a considerably bright room.

(Modifications)

Without limited to the examples as described above, various alterations and modifications are possible, and these are also within the equivalence of the present invention.

While in the above example, one aspect which uses the reflecting layer 13, polarizing layer 16A and polarizing filter 17 for adjusting the polarization direction of the image light in combination with the unit prism shapes 12 and light absorbing portions 14 was described, the use of these components is not limited to this aspect, and some of these components may be optionally omitted, for example, the polarizing layer 16A may be excluded.

Third Embodiment

Next, a third embodiment of the present invention will be described. In the third embodiment according to the present invention, the light transmitting portions 12 comprising the plurality of unit prism shapes 12 of the reflecting screen 10 in the first embodiment shown in FIGS. 1 to 17 are formed of a curable resin, such as UV curing resins, electron-beam curing resins or radiation curing resins, but the other construction is substantially the same as the first embodiment shown in FIGS. 1 to 17.

The lowering start point of storage elasticity (Tg) in the range of dynamic viscoelasticity of these resins is in the range from −60° C. to 25° C. or 60° C. to 150° C. and the storage elasticity in the range of rubber-like elasticity above the glass transition point of these resins is greater than $10^{10}$ Pa.

The curable resin for forming the light transmitting portions 12 contains at least one type of urethane acrylates as an oligomer component.

The base portion 11 of the reflecting screen 10 is formed of PET or PC, and has a thickness of 10 to 188 μm. The total thickness of the combined body made of the light transmitting portions 12 and the light absorbing portions 14 is in the range from 20 to 200 μm.

Next, a specific example of the present invention will be described.

On a PET base material with a 100 μm thickness as the base portion 11, a light transmitting UV curing resin (for light transmitting portions 12) with a glass transition point of 20° C. and a black color and light absorbing UV curing resin (for light absorbing portions 14) are coated such that the total thickness of the combined body to be formed of the light transmitting portions 12 and light absorbing portions 14 will be 150 μm, thus producing the reflecting screen 10. The so produced reflecting screen 10 is then attached to a 50 mm φ roll core using a double-sided adhesive tape to prepare a roll screen. Thereafter, the roll screen was stored for a week in an oven at 60° C. while maintaining the rolled state. Upon evaluation of the appearance, the screen showed a good appearance without presenting any rolling mark.

Next, a comparative example will be described.

A light transmitting UV curing resin with a glass transition point of 40° C. and a black color and light absorbing UV curing resin are coated such that the total thickness will be 150 μm on a PET base material with a 100 μm thickness as the base portion, thus producing the reflecting screen 10. The so produced reflecting screen 10 is then attached to a 50 mm φ roll core using a double-sided adhesive tape to prepare a roll screen. Thereafter, the roll screen was stored for a week in an oven at 60° C. while maintaining the rolled state. Upon evaluation of the appearance, remarkably large rolling marks were found.

Fourth Embodiment

Figure 21:
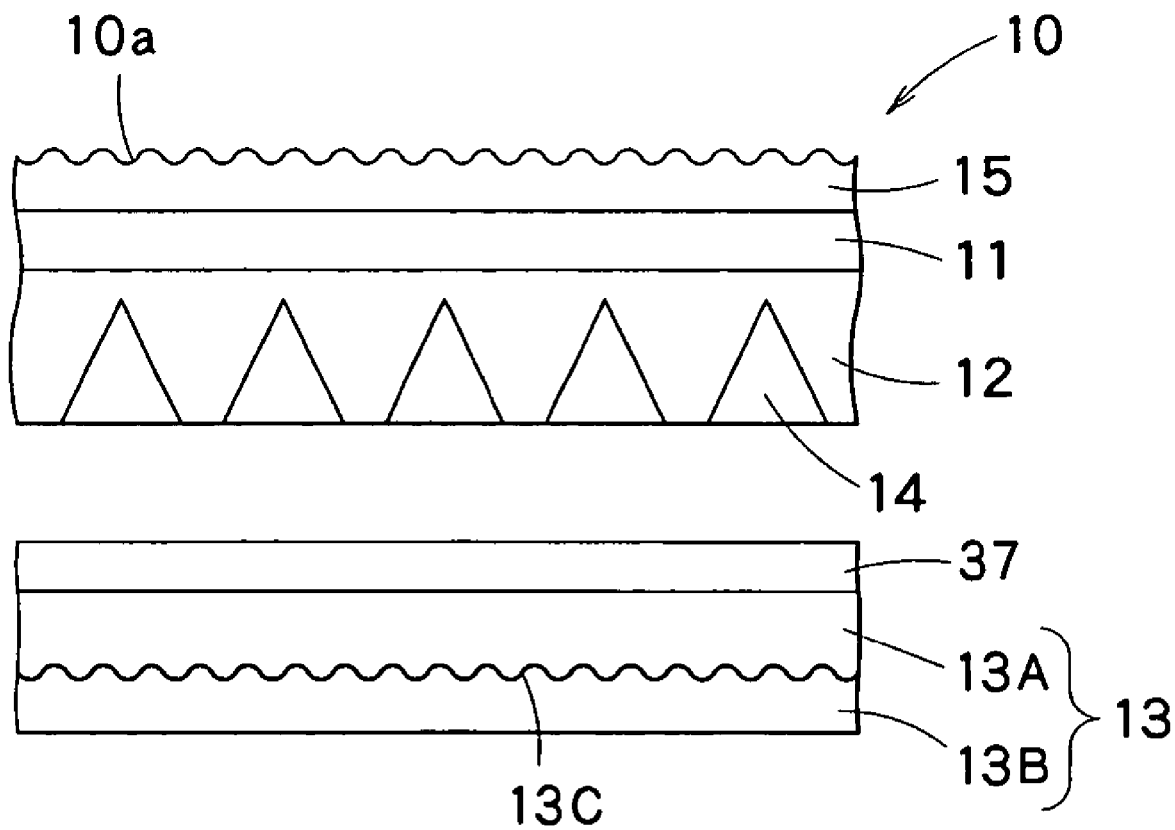
FIG. 21 is a diagram showing a reflecting screen of a fourth embodiment of the present invention.

Finally, a fourth embodiment of the present invention will be described with reference to FIG. 21. As shown in FIG. 21, the reflecting screen 10 comprises a base portion 11, and light transmitting portions 12 and light absorbing portions 14 both provided on the base portion 11. The light transmitting portions 12 and the light absorbing portions 14 are arranged alternately while extending linearly along the screen face 10a.

On the base portion 11 is formed a concavo-convex surface constituting a front face treating layer 15 to which an anti-static treatment is applied. In addition, a reflecting layer 13 is provided to the light transmitting portions 12 and the light absorbing portions 14 through an adhesive layer or cohesive layer 37.

The reflecting layer 13 comprises a reflecting film or reflecting plate. This reflecting layer 13 includes a white color film 13A having a total light reflectance greater than 30% and a total light transmittance greater than 50% and a reflection concealing layer 13B provided on the rear face of the white color film 13A and formed by Al deposition or a silver coating material.

The white color film 13A is composed of a synthetic resin film selected from the group consisting of PET, modified PET, PEN, PC, PMMA, PE, copolymerized modified PE, PP, and PVC.

The surface on the side of the reflection concealing layer 13B of the white color film 13A is a matted surface 13C. The matted surface 13C is formed from a UV curing resin or electron-beam curing resin or by sand blasting.

When the reflection concealing layer 13B is provided by coating a silver coating material, a material exhibiting a surface resistance of $10^{10}\Omega$ or less is used as the silver coating material.

The adhesive agent or cohesive agent 37 has a light transmittance of 70% or higher and contains at least one type of diffusing beads having an average particle diameter of 1 to 20 μm.

According to this embodiment, the reflecting screen 10 can be manufactured simply and easily by providing the reflecting layer 13 to the light transmitting portions 12 and the light absorbing portions 14 through the adhesive layer or cohesive layer 37.

Also, the reflecting screen 10 presenting an excellent definition of images can be produced.

The invention claimed is:

1. A reflecting screen adapted to reflect image light projected from an image source and including a screen face, comprising:

light transmitting portions that transmits light; and
light absorbing portions that absorbs light,
wherein the light transmitting portions and the light absorbing portions are formed to alternately extend along the screen face,
a reflecting layer that reflects the image light, which has been transmitted through the light transmitting portions, is provided at least on the rear face side of each light transmitting portion,
a deforming diffusion layer which strongly diffuses the light transmitted through the deforming diffusion layer in a certain direction, and
the direction of the transmitted image light that the deforming diffusion layer strongly diffuses is coincident with the direction along which the light transmitting portions and the light absorbing portions extend.

2. The reflecting screen according to claim 1,
wherein the refractive index of the light absorbing portions is lower than the refractive index of the light transmitting portions.

3. The reflecting screen according to claim 1,
wherein each of the light absorbing portions comprises micro-beads adapted to absorb light.

4. The reflecting screen according to claim 1,
wherein at least one of anti-glaring, antireflection finish, antistatic treatment, hard-coating, and antifouling is applied to the surface on the side of the image source.

5. The reflecting screen according to claim 1,
wherein the reflecting screen can be hoisted when it is not used.

* * * * *